(12) United States Patent
Liu

(10) Patent No.: US 12,219,506 B2
(45) Date of Patent: Feb. 4, 2025

(54) INFORMATION TRANSMISSION METHOD AND APPARATUS AND COMPUTER-READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 495 days.

(21) Appl. No.: 17/606,999

(22) PCT Filed: Apr. 29, 2019

(86) PCT No.: PCT/CN2019/085037
§ 371 (c)(1),
(2) Date: Oct. 27, 2021

(87) PCT Pub. No.: WO2020/220214
PCT Pub. Date: Nov. 5, 2020

(65) Prior Publication Data
US 2022/0217660 A1    Jul. 7, 2022

(51) Int. Cl.
H04W 56/00    (2009.01)
H04L 27/26    (2006.01)
(Continued)

(52) U.S. Cl.
CPC ..... H04W 56/001 (2013.01); H04L 27/26025 (2021.01); H04W 72/0446 (2013.01); H04W 72/23 (2023.01)

(58) Field of Classification Search
CPC .......... H04W 56/001; H04W 72/0446; H04W 72/23; H04W 48/12; H04W 74/006;
(Continued)

(56) References Cited

U.S. PATENT DOCUMENTS

2015/0341099 A1* 11/2015 Kang ................... H04B 7/0634
375/267
2019/0036589 A1* 1/2019 Ren ........................ H04L 5/0035
(Continued)

FOREIGN PATENT DOCUMENTS

EP          3471297 A1     4/2019
WO   WO 2018204260 A1    11/2018
(Continued)

OTHER PUBLICATIONS

R1-1905685 Initial access—Motorola (Year: 2019).*
(Continued)

*Primary Examiner* — Sudesh M Patidar
(74) *Attorney, Agent, or Firm* — Cozen O'Connor

(57) ABSTRACT

An information transmission method. The method comprises: generating configuration information, wherein the configuration information is used for indicating that there is a synchronization signal block (SSB) candidate position in a time slot or the configuration information is used for indicating that there are two SSB candidate positions in a time slot, and the SSB candidate position is a time domain position where an access network device might send an SSB; and sending the SSB, wherein a PBCH of the SSB carries the configuration information.

14 Claims, 8 Drawing Sheets

(51) Int. Cl.
*H04W 72/0446* (2023.01)
*H04W 72/23* (2023.01)

(58) Field of Classification Search
CPC ............ H04W 48/10; H04L 27/26025; H04L 5/0053; H04L 5/0023; H04L 5/0048; H04L 5/0094; H04B 7/0695; H04B 7/0617; Y02D 30/70
See application file for complete search history.

(56) References Cited

U.S. PATENT DOCUMENTS

| | | | |
|---|---|---|---|
| 2020/0228275 A1* | 7/2020 | Li | H04W 72/0446 |
| 2020/0396122 A1* | 12/2020 | Da | H04L 41/0896 |
| 2021/0007072 A1* | 1/2021 | Wu | H04L 5/0053 |
| 2021/0320833 A1* | 10/2021 | Kim | H04W 74/0833 |
| 2021/0400725 A1* | 12/2021 | Harada | H04L 5/0005 |
| 2022/0086904 A1* | 3/2022 | Ko | H04W 56/0015 |
| 2022/0094487 A1* | 3/2022 | Mondal | H04W 72/044 |
| 2022/0150849 A1* | 5/2022 | Zhao | H04L 27/2626 |

FOREIGN PATENT DOCUMENTS

| | | | |
|---|---|---|---|
| WO | WO 2019022519 A1 | 1/2019 | |
| WO | WO-2020177040 A1 * | 9/2020 | ......... H04L 27/2602 |

OTHER PUBLICATIONS

Russian Patent Application No. 2021134605, Office Action dated Aug. 23, 2022, 8 pages.
Russian Patent Application No. 2021134605, English translation of Office Action dated Aug. 23, 2022, 7 pages.
Japanese Patent Application No. 2021-564320, Office Action dated Nov. 8, 2022, 4 pages.
Japanese Patent Application No. 2021-564320, English translation of Office Action dated Nov. 8, 2022, 4 pages.
VIVO "Discussion on enhancements to initial access procedure" 3GPP TSG RAN WG1 #96bis, R1-1904066, Apr. 2019, 12 pages.
European Patent Application No. 19927315.2, Search and Opinion dated Dec. 6, 2022, 15 pages.
Qualcomm Incorporated "Initial access and mobility procedures for NR unlicensed" 3GPP TSG RAN WG1 Meeting #96bis, R1-1905000, Apr. 2019, 15 pages.

* cited by examiner

INFORMATION TRANSMISSION METHOD AND APPARATUS AND COMPUTER-READABLE STORAGE MEDIUM

CROSS-REFERENCE TO RELATED APPLICATION(S)

The present application is a US national phase of International Patent Application No. PCT/CN2019/085037, filed on Apr. 29, 2019, the disclosure of which is incorporated herein by reference in its entirety.

TECHNICAL FIELD

The disclosure relates to the field of communication technology, and more particularly, to a method for transmitting information, an apparatus for transmitting information and a computer readable storage medium.

BACKGROUND

In a new radio (NR) system, devices are allowed to use unlicensed spectrum for transmitting signals.

Before using the unlicensed spectrum for transmitting signals, the devices need to follow a listen-before-talk (LBT) principle, that is, the devices need to perform a clear channel assessment (CCA) to determine whether channels of the unlicensed spectrum are occupied, and if it is determined that the channels are not occupied, the signals are sent through the channels of the unlicensed spectrum.

According to the LBT principle, positions where the access network device sends a synchronization signal block (SSB) in each period are not fixed.

SUMMARY

In one embodiment, a method for transmitting information is provided. The method includes: generating configuration information by an access network device, in which the configuration information is used to indicate that there is a synchronization signal block (SSB) candidate position in a time slot or the configuration information is used to indicate that there are two SSB candidate positions in a time slot, and the SSB candidate position is a time domain position where the access network device might send an SSB; and sending the SSB by the access network device, in which a physical broadcast channel (PBCH) of the SSB carries the configuration information.

In one embodiment, a method for transmitting information is provided. The method includes: receiving a synchronization signal block (SSB) sent by an access network device, in which the SSB carries configuration information, the configuration information is used to indicate that there is a SSB candidate position in a time slot or the configuration information is used to indicate that there are two SSB candidate positions in a time slot, and the SSB candidate position is a time domain position where the access network device might send the SSB; acquiring the configuration information from a physical broadcast channel (PBCH) of the received SSB; and determining the SSB candidate position based on the configuration information.

In one embodiment, an apparatus for transmitting information is provided. The apparatus includes: a processor and a memory for storing processor executable instructions. The processor is configured to execute a method for transmitting information as described above.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The "plurality" mentioned herein means two or more. "And/or" describes the association relationship of the associated objects, indicating that there can be three types of relationships, for example, A and/or B, which can mean: A alone exists, A and B exist at the same time, and B exists alone. The character "/" generally indicates that the associated objects before and after are in an "or" relationship. The "first", "second" and similar words used in the specification and claims of this application do not denote any order, quantity or importance, but are only used to distinguish different components.

Figure 1:
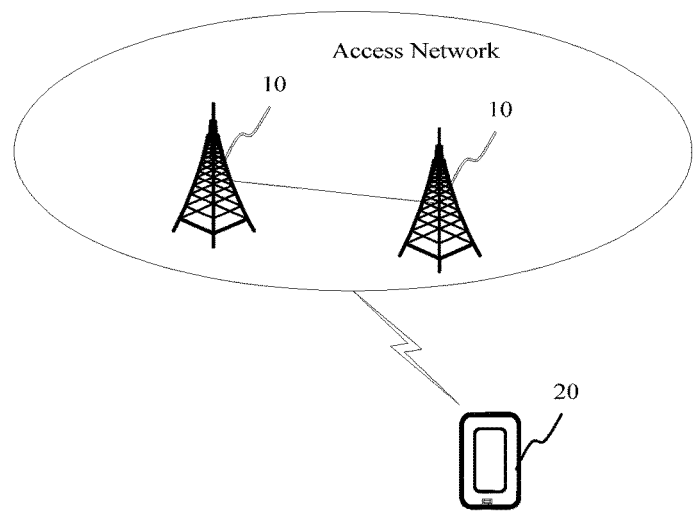
FIG. 1 is a schematic diagram illustrating an architecture of a communication system according to an embodiment.

FIG. 1 is a schematic diagram illustrating an architecture of a mobile communication system according to an embodiment. The mobile communication system may include: an access network device 10 and a terminal 20.

The access network device 10 is deployed in a wireless access network to provide the terminal 20 with a wireless access function. The access network device may be a base station (BS). The access network device 10 may wirelessly communicate with the terminal 20 via one or more antennas. The access network device 10 can provide communication coverage for a geographic area where the access network device 10 is located. The base stations may include such as macro base stations, micro base stations, relay stations, and access points. In some embodiments, the base station may be referred to by those skilled in the art as a base station transceiver, a wireless base station, an access point, a wireless transceiver, a basic service set (BSS), an extended service set (ESS), a NodeB, an evolved NodeB (eNB or eNodeB) or some other appropriate terms. For example, in a fifth generation (5G) system, the base station is called gNB. For ease of description, in embodiments of the disclosure, the above devices for providing wireless communication functions for the terminal 20 are collectively referred to as the access network device.

Terminals 20 may be distributed within the mobile communication system, and each terminal 20 may be stationary or mobile. The terminal 20 can also be referred to by those skilled in the art as a mobile station, a user station, a mobile unit, a user unit, a wireless unit, a remote unit, a mobile device, a user device, a wireless device, a wireless communication device, a remote device, a mobile user station, an access terminal, a mobile terminal, a wireless terminal, a remote terminal, a handheld device, a user agent, a mobile client, a client or some other appropriate terms. The terminal 20 may be a cellular phone, a personal digital assistant (PDA), a wireless modem, a wireless communication device, a handheld device, a tablet computer, a laptop computer, a cordless telephone, and a wireless local loop (WLL) station. The terminal 20 can communicate with the access network device 10 in the mobile communication system.

The access network device 10 can communicate with the terminal 20 through air interface technology, for example, through cellular technology. The communication link between the access network device 10 and the terminal 20 may include: down link (DL) transmission from the access network device 10 to the terminal 20, and/or, up link (UP) transmission from the terminal 20 to the access network device 10. The DL transmission may also be referred to as forward link transmission, and the UP transmission may also be referred to as reverse link transmission. In some examples, the DL transmission may include the transmission of a discovery signal. The discovery signal may include a reference signal and/or a synchronization signal.

The mobile communication system illustrated in FIG. 1 can be a Long Term Evolution (LTE) system, a next-generation evolution system based on the LTE system, such as the LTE-Advanced (LTE-A) system or the 5G system (also known as NR system), or a next-generation evolution system based on the 5G system. In some embodiments of the disclosure, the terms "system" and "network" are often used interchangeably, which can be understood by those skilled in the art.

The communication system and service scenarios described in embodiments of the disclosure are intended to clearly illustrate the technical solution according to embodiments of the disclosure, and do not constitute a limitation to the technical solutions according to the embodiments of disclosure. Those of ordinary skill in the art will know that with the evolution of communication systems and the emergence of new service scenarios, the technical solutions according to the embodiments of the disclosure are equally applicable to similar technical problems.

In a traditional LTE system, data transmission is performed between the access network device 10 and the terminal 20 through licensed spectrums. With the increase in service volume, especially in some urban areas, the licensed spectrums may be difficult to meet the requirements of the service volume. By introducing licensed-assisted access (LAA) technology, it is possible to enable the data transmission between the access network device 10 and the terminal 20 through unlicensed spectrums to meet high service volume requirements.

The unlicensed spectrum is a spectrum set by a country or a region that can be used for radio device communication. This spectrum is generally considered to be a shared spectrum. That is, the communication devices of different communication systems that meet the regulatory requirements set by the country or region on the spectrum can use this spectrum, without the need of applying for a license for a proprietary spectrum from the government. The unlicensed spectrum can also be referred to by those skilled in the art as unauthorized spectrum, shared spectrum, unauthorized frequency band, unlicensed frequency band, shared frequency band, license-free spectrum, license-free frequency band, or some other appropriate terminology.

The third generation partnership project (3GPP) discusses NR unlicensed technology, which is used for communication using NR technology on the unlicensed spectrum. For the NR unlicensed technology, it is also necessary to send a synchronization signal block (SSB). In the non-standalone mode, the SSB can be used for synchronization and measurement of the terminal 20. In the standalone mode, the SSB can also be used for initial access of the terminal 20.

In the time domain, one SSB occupies 4 symbols (i.e., orthogonal frequency division multiplexing (OFDM) symbols), including a primary synchronized signal (PSS) occupying 1 symbol, a secondary synchronized signal (SSS) occupying 1 symbol, and a physical broadcast channel (PBCH) occupying 2 symbols. In the SSB, the symbols have the serial numbers from 0 to 3 in ascending order respectively. In the frequency domain, one SSB occupies 24 consecutive resource blocks (RB). Each RB includes 12 subcarriers. Starting from a RB with the minimal serial number, the subcarriers in the above 24 RBs have the serial numbers from 0 to 287 in ascending order respectively. For the PSS and SSS, resources are mapped to the $127^{th}$ subcarrier in the middle. For the PBCH, resources are mapped to the $288^{th}$ subcarrier. The PSS, the SSS, and the PBCH have the same cyclic prefix (CP) length and the same subcarrier spacing. The subcarrier spacing can be configured as 15 kHz, 30 kHz, 120 kHz and 240 kHz.

The access network device can send a signal with an omnidirectional beam or multiple directional beams. That is, the number of beams used by the access network device may be one or more. In the frequency band of the current new radio unlicensed spectrum (NRU), the access network device can use 8 directional beams at most. Generally, the even number of directional beams are used. Therefore, the number of beams used by the access network device is generally 1, 2, 4, or 8. When the number is 1, the beam used by the access network device is the omnidirectional beam, covering 360 degrees or an angle less than 360 degrees which is determined based on the actual environment. When the number is plural, the beams used by the access network device are directional beams, all beams cover 360 degrees together, and each beam covers 360/n, where n is the number of beams. For example, when the number of beams is 4, each beam covers 90 degrees.

Since the frequency band used by the NRU is relatively high, the signals are generally transmitted through the directional beams. When the access network device uses the directional beams to send the signal, in order to cover all the cells configured for the access network device, the access network device needs to use multiple beams of different directions to send the same information in turn. This process can be called beam scanning.

To support the beam scanning, the SSBs are organized into a series of bursts and are sent periodically. In the case of multi-beam scanning, in each SSB period, the access network device can use multiple beams to send the SSBs in turn. Multiple SSBs sent in each SSB period form a burst, and these multiple SSBs have serial numbers in ascending order starting from 0. The number of SSBs in a burst can be the same as the number of beams used by the access network device, and the SSBs in the burst are sent using different beams.

Figure 2:
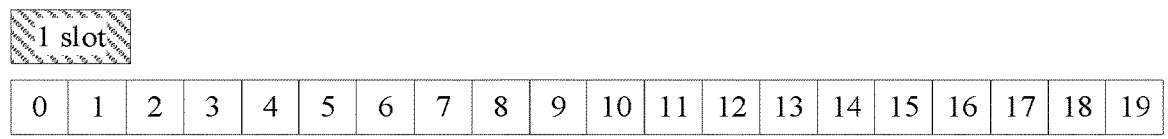
FIG. 2 is a schematic diagram illustrating a distribution of SSB candidate positions according to an embodiment.
Figure 3:
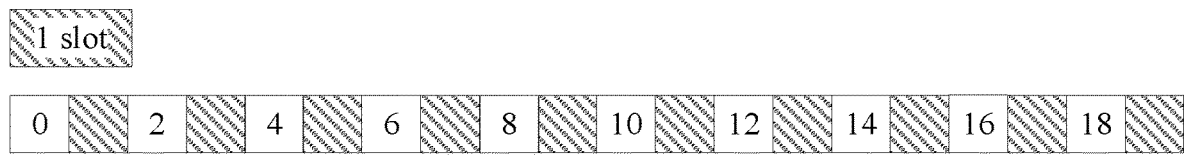
FIG. 3 is a schematic diagram illustrating a distribution of SSB candidate positions according to an embodiment.

There may be multiple SSB candidate positions in each SSB period. Each SSB candidate position is a time domain position where the access network device may send the SSB. These SSB candidate positions have the serial numbers in ascending order starting from 0. FIG. 2 is a schematic diagram illustrating a distribution of the SSB candidate positions. As illustrated in FIG. 2, taking the subcarrier spacing being 30 KHz as an example, there are 20 SSB candidate positions within a half of a frame (5 ms), where 1 ms includes 2 slots, each slot includes 2 SSB candidate positions, and thus there are 20 SSB candidate positions within 5 ms, i.e., SSB candidate positions 0-19. FIG. 3 is a schematic diagram illustrating another distribution of the SSB candidate positions. As illustrated in FIG. 3, taking the subcarrier spacing being 30 KHz as an example, there are 10 SSB candidate positions in a half of a frame (5 ms), where 1 ms includes 2 slots, each slot includes 1 SSB candidate position, and thus there are 10 SSB candidate positions within 5 ms. These 10 SSB candidate positions have the even serial numbers in ascending order starting from 0. That is, the serial numbers of the 10 SSB candidate positions are 2n respectively, where n ranges from 0 to 9.

All the SSB candidate positions in one SSB period correspond in sequence to the beams used by the base station respectively. For example, when the number of beams used by the access network device is 2 and the number of the SSB candidate positions is 20, a first SSB candidate position corresponds to a first beam, a second SSB candidate position corresponds to a second beam, a third SSB candidate position corresponds to the first beam, a fourth SSB candidate position corresponds to the second beam, and so on. Here, "the SSB candidate position corresponds to a certain beam" means that the beam can transmit the SSB at the corresponding SSB candidate position and beams other than the beam cannot transmit the SSB at the SSB candidate position.

Since the number of the SSB candidate positions is generally greater than the number of beams used by the access network device, in one SSB period, each beam may send the SSB at one SSB candidate position among the corresponding SSB candidate positions. Here, the multiple SSB candidate positions corresponding to the same beam form the SSB candidate position set of the beam. A result obtained by performing a certain operation on the index of each SSB candidate position in the SSB candidate position set and a related parameter of the beam equals to each other, such that the terminal can obtain SSB candidate position set through division based on the indexes of the SSB candidate positions and the value of the related parameter of the beam. For example, a modulo operation is performed on the index of each SSB candidate position and the value of the quasi co-located (QCL) parameter. The modulo operation refers to dividing the index of the SSB candidate position by the value of the QCL parameter to obtain the remainder as the result of the modulo operation.

In some embodiments of the disclosure, selectable values of the QCL parameter may correspond to a value of the QCL parameter that may be used by the access network device respectively. For example, the value of the QCL parameter may be equal to the number of beams. Therefore, the indication information may be used to indicate the number of beams, i.e., the value of the QCL parameter is used to indicate the number of beams or is associated with the number of beams. Since the signals transmitted by the same beam have the QCL relationship, in some embodiments of the disclosure, the division of the SSB candidate positions is performed based on the value of the QCL parameter.

As an example, when the number of beams used by the access network device is 4, the value of the QCL parameter is also 4, the 4 beams are beams 1 to 4, and the beams 1 to 4 are adjacent in the clockwise or counterclockwise direction successively. The number of the SSB candidate positions is 20. These 20 SSB candidate positions have serial numbers in ascending order starting from 0, and the indexes of these 20 SSB candidate positions are SSB candidate positions 0-19 respectively.

The SSB candidate positions that the remainders obtained by performing the modulo operation on the indexes of these SSB candidate positions and 4 (i.e., the value of QCL parameter) are 0 are determined from the SSB candidate positions 0-19 as the SSB candidate positions of a first SSB candidate position set corresponding to the beam 1, including the SSB candidate position 0, the SSB candidate position 4, the SSB candidate position 8, the SSB candidate position 12, and the SSB candidate position 16. The SSB candidate positions that the remainders obtained by performing the modulo operation on the indexes of these SSB candidate positions and 4 (i.e., the value of QCL parameter) are 1 are determined from the SSB candidate positions 0-19 as the SSB candidate positions of a second SSB candidate position set corresponding to the beam 2, including the SSB candidate position 1, the SSB candidate position 5, the SSB candidate position 9, the SSB candidate position 13, and the SSB candidate position 17. The SSB candidate positions that the remainders obtained by performing the modulo operation on the indexes of the SSB candidate positions and 4 (i.e., the value of QCL parameter) are 2 are determined from the SSB candidate positions 0-19 as the SSB candidate positions of a third SSB candidate position set corresponding to the beam 3, including the SSB candidate position 2, the SSB candidate position 6, the SSB candidate position 10, the SSB candidate position 14, and the SSB candidate position 18. The SSB candidate positions that the remainders obtained by performing the modulo operation on the indexes of the SSB candidate positions and 4 (i.e., the value of QCL parameter) are 3 are determined from the SSB candidate positions 0-19 as the SSB candidate positions of a fourth SSB candidate position set corresponding to the beam 4, including the SSB candidate position 3, the SSB candidate position 7, the SSB candidate position 11, the SSB candidate position 15, and the SSB candidate position 19.

Before using the unlicensed spectrum for signal transmission, the device needs to follow the LBT principle. That is, the device needs to perform channel listening, such as clear channel assessment (CCA) to determine whether the channel of the unlicensed spectrum is occupied (that is, whether the channel is idle). If it is determined that the channel of the unlicensed spectrum is not occupied, the signal is sent through the channel of the unlicensed spectrum. Therefore, the access network device also needs to listen the channel before sending the SSB. If the channel is not occupied, the SSB can be sent at the current SSB candidate position. If the channel is occupied, other SSB candidate positions are re-selected based on a preset rule to send the SSBs. Therefore, the sending position of the burst in each SSB period is not fixed.

In the initial access process, after receiving the SSB, the terminal can obtain the physical downlink control channel (PDCCH) associated with the remaining minimum system information (RMSI) according to the SSB, obtain the physical downlink shared channel (PDSCH) corresponding to the PDCCH, and obtain the RMSI through the analysis from the PDSCH. Since the RMSI is large-scaled, there may be a case where the obtaining of the RMSI through the analysis fails. In this case, it needs to continue detecting the SSBs in a next period to obtain the RMSI again based on the detected SSBs until the obtaining of the RMSI through the analysis is successful. The detection includes, but is not limited to, receiving the SSB and/or determining the receiving position (i.e., the SSB candidation position where the SSB is sent) of the SSB through energy detection.

In the related art, the terminal receives the SSB through blind detection during the initial access process, and determines the SSB candidate position (i.e., the position where the access network device might send the SSB) after performing the uplink synchronization based on the received SSB. Since the position where the access network device sends the SSB in each period is not fixed, the terminal needs to perform the detection at each SSB candidate position to obtain the required signal (for example, the PDCCH associated with the RMSI). In the case that there are two distributions of the SSB candidate positions, if the terminal does not know which distribution of the SSB candidate positions is currently used by the access network device, the detection can be performed based on the SSB candidate positions illustrated in FIG. 2. In this case, if the access network device uses the SSB candidate positions illustrated in FIG. 3 to perform the detection, unnecessary detection of the terminal and unnecessary power consumption may be caused.

Figure 4:
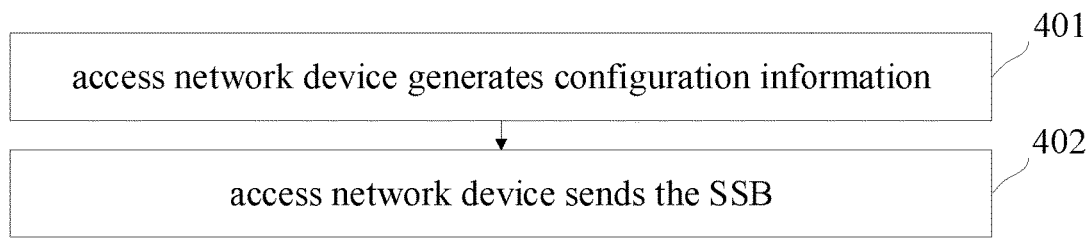
FIG. 4 is a flowchart illustrating a method for transmitting information according to an embodiment.

FIG. 4 is a flowchart illustrating a method for transmitting information according to an embodiment. The method can be executed by the access network device as illustrated in FIG. 1. As illustrated in FIG. 4, the method includes the following.

In step 401, the access network device generates configuration information.

The configuration information is used to indicate that there is a synchronization signal block (SSB) candidate position in a time slot or the configuration information is used to indicate that there are two SSB candidate positions in a time slot. The SSB candidate position is a time domain position where the access network device might send an SSB.

In step 402, the access network device sends the SSB. The SSB carries the configuration information.

Optionally, the configuration information is represented by a bit of the PBCH in the NR technology, where the bit is used to indicate a remaining minimum system information (RMSI) subcarrier spacing (SCS), or the configuration information is represented by a reserved bit in the PBCH.

Optionally, the PBCH of the SSB further carries indication information used to indicate a value of a quasi co-located (QCL) parameter adopted by the access network device.

Optionally, the value of the QCL parameter adopted by the access network device belongs to a first set of selectable values, the value of the QCL parameter indicated by the indication information belongs to a second set of selectable values, the number of elements in the first set of selectable values is n, where n is greater than or equal to 2, the number of elements in the second set of selectable values is (n−1), and the second set of selectable values is a subset of the first set of selectable values.

Optionally, the first set of selectable values is {1, 2, 4, 8}, and the elements in the second set of selectable values are any three of 1, 2, 4, and 8; or, the first set of selectable values is {2, 4, 8}, and the elements in the second set of selectable values are any two of 2, 4, and 8.

Optionally, the PBCH of the SSB further carries indication information used to indicate whether a value of the QCL parameter adopted by the access network device belongs to a first set or a second set. An intersection set between the first set and the second set is empty.

Optionally, the first set is {8}, and the second set is {1, 2, 4}; or, the first set is {4, 8}, and the second set is {1, 2}.

Optionally, the indication information is represented by a reserved bit in the PBCH.

It is worth noting that steps 401-402 and the optional steps can be combined arbitrarily.

Figure 5:
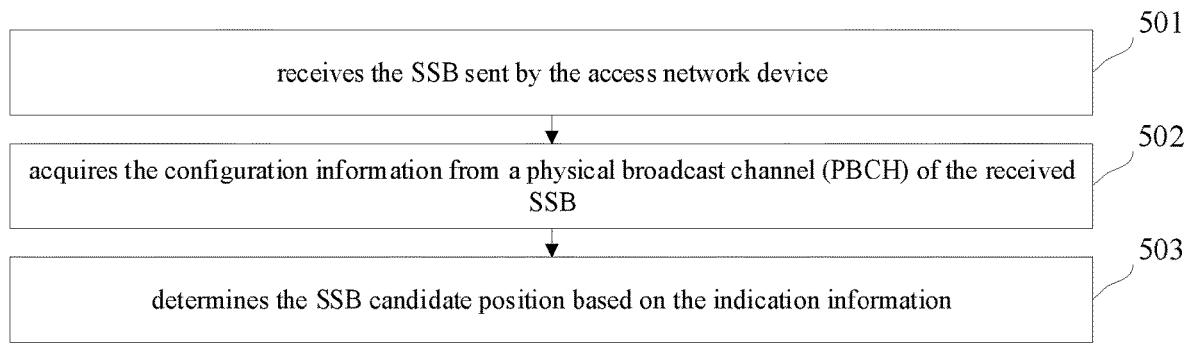
FIG. 5 is a flowchart illustrating a method for transmitting information according to an embodiment.

FIG. 5 is a flowchart illustrating a method for transmitting information according to an embodiment. The method can be executed by the terminal as illustrated in FIG. 1. As illustrated in FIG. 5, the method includes the following.

In step 501, the SSB sent by an access network device is received. The SSB carries configuration information. The configuration information is used to indicate that there is a SSB candidate position in a time slot or the configuration information is used to indicate that there are two SSB candidate positions in a time slot. The SSB candidate position is a time domain position where the access network device might send the SSB.

In step 502, the configuration information is obtained from a physical broadcast channel (PBCH) of the received SSB.

In step 503, the SSB candidate position is determined based on the configuration information.

Optionally, the configuration information is represented by a bit of the PBCH in the NR technology, where the bit is used to indicate the RMSI SCS, or the configuration information is represented by a reserved bit in the PBCH.

Optionally, the PBCH of the SSB further carries indication information used to indicate a value of the QCL parameter adopted by the access network device.

Optionally, the number of elements in the first set of selectable values is n, where n is greater than or equal to 2, the number of elements in the second set of selectable values is (n−1), and the second set of selectable values is a subset of the first set of selectable values.

Optionally, the value of the QCL parameter adopted by the access network device belongs to the first set of selectable values, the value of the QCL parameter indicated by the indication information belongs to the second set of selectable values, the first set of selectable values is {1, 2, 4, 8}, the elements in the second set of selectable values are any three of 1, 2, 4, and 8; or, the first set of selectable values is {2, 4, 8}, and the elements in the second set of selectable values are any two of 2, 4, and 8.

Optionally, the PBCH of the SSB further carries indication information used to indicate whether the value of the QCL parameter adopted by the access network device belongs to the first set or the second set. An intersection set between the first set and the second set is empty.

Optionally, the first set is {8}, and the second set is {1, 2, 4}; or, the first set is {4, 8}, and the second set is {1, 2}.

Optionally, the indication information is represented by a reserved bit in the PBCH.

Optionally, the method further includes: determining, by the terminal, a signal detection position based on the SSB candidate position; and detecting, by the terminal, the SSB in a second period based on the signal detection position.

Optionally, determining, by the terminal, the signal detection position based on the SSB candidate position includes: determining each SSB candidate position as a signal detection position; or, determining the signal detection position based on the SSB candidate position, the indication information and a first SSB candidate position. The indication information is used to indicate the value of the QCL parameter adopted by the access network device or the indication information is used to indicate whether the QCL parameter adopted by the access network device belongs to the first set or a second set. The intersection set of the first set and the second set is empty, and the first SSB candidate position is the SSB candidate position where the SSB is received.

Optionally, determining the signal detection position based on the SSB candidate position, the indication information and the first SSB candidate position includes: determining a SSB candidate position set to which the first SSB candidate position belongs based on the indication information and the SSB candidate position and determining each SSB candidate position in the SSB candidate position set to which the first SSB candidate position belongs as a signal detection position. Each SSB candidate position set includes at least one SSB candidate position, and the at least one SSB candidate position in each SSB candidate position set corresponds to the same beam.

Optionally, in response to the indication information being first indication information and the first set being {8}, a result obtained by performing a modulo operation, with a value of 8, on an index of each SSB candidate position in the SSB candidate position set equals to each other; or, in response to the indication information being second indication information and the second set being {1, 2, 4}, a result obtained by performing a modulo operation, with a value of 4, on an index of each SSB candidate position in the SSB candidate position set equals to each other; or, in response to the indication information being first indication information and the first set being {4, 8}, a result obtained by performing a modulo operation, with a value of 4, on an index of each SSB candidate position in the SSB candidate position set equals to each other; or, in response to the indication information being second indication information and the second set being {1, 2}, a result obtained by performing a modulo operation, with a value of 1, on an index of each SSB candidate position in the SSB candidate position set equals to each other.

Optionally, the method further includes: in response to detecting the SSB at any one SSB candidate position, determining a physical downlink control channel (PDCCH) associated with the RMSI based on the SSB candidate position where the SSB is detected; and obtaining the RMSI based on the PDCCH.

It is worth noting that steps 501-503 and the optional steps can be combined arbitrarily.

Figure 6:
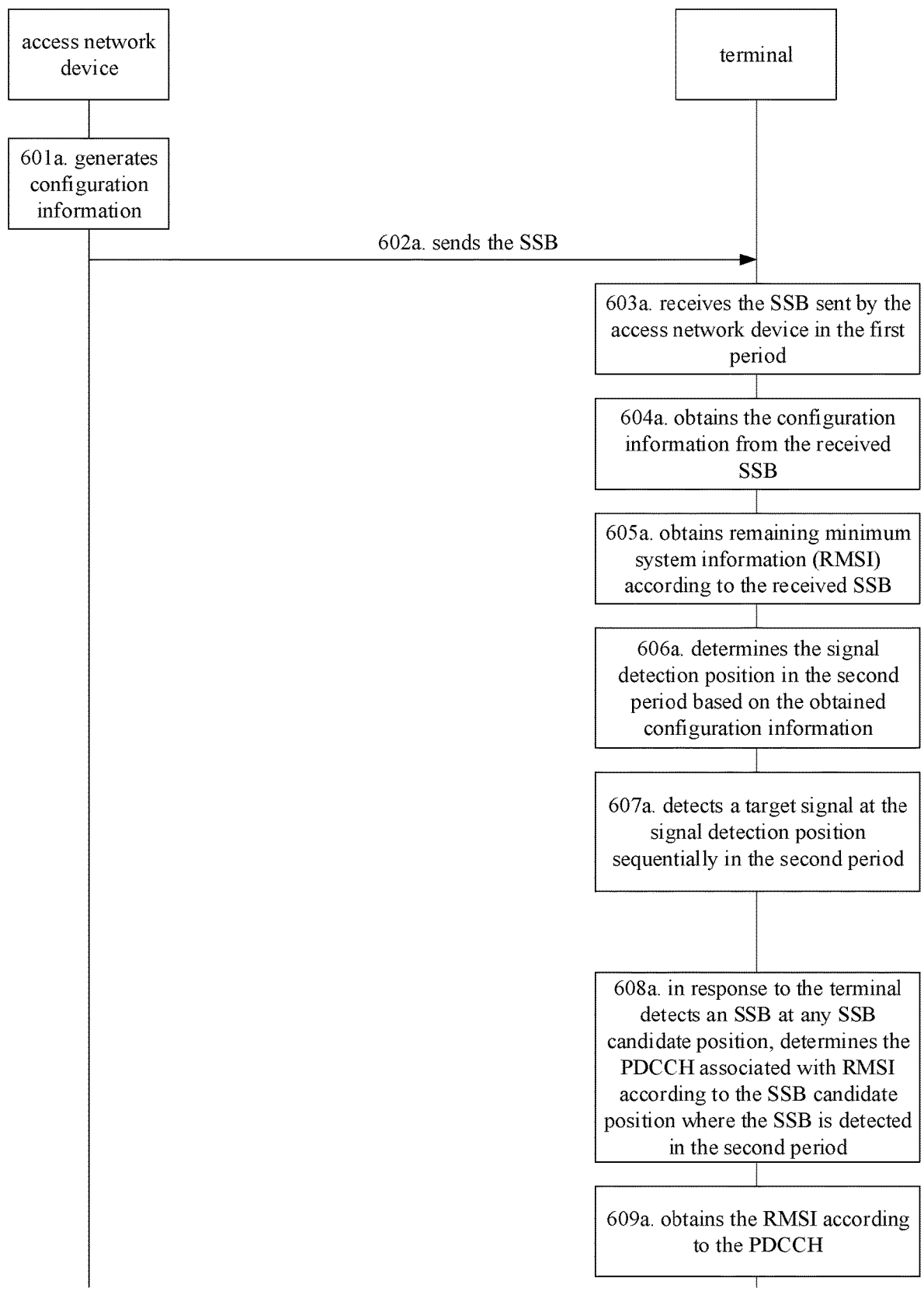
FIG. 6 is a flowchart illustrating a method for transmitting information according to an embodiment.

FIG. 6 is a flowchart illustrating a method for transmitting information according to an embodiment. As illustrated in FIG. 6, the method includes the following.

In step 601a, an access network device generates configuration information.

The configuration information is used to indicate that there is a synchronization signal block (SSB) candidate position in a time slot or the configuration information is used to indicate that there are two SSB candidate positions in a time slot, and the SSB candidate position is a time domain position where the access network device might send an SSB.

In step 602a, the access network device sends the SSB.

The SSB carries the configuration information generated in the step 601a.

Optionally, the configuration information is represented by a bit of the PBCH used to indicate a RMSI SCS in the NB technology, or the configuration information is represented by a reserved bit in the PBCH.

In the NR technology, there is a bit of the PBCH used to indicate the RMSI SCS. For the NRU technology, since the sub-carrier spacing of RMSI is the same as the sub-carrier spacing of the SSB, the terminal can know the sub-carrier spacing of the RMSI after knowing the sub-carrier spacing of the SSB. Therefore, there is no need to use an additional bit to indicate the RMSI SCS. Therefore, the bit used to indicate the RMSI SCS in the NR technology can be used to represent the configuration information, that is, existing idle bits are used to indicate new information without changing the structure of the SSB. In the PBCH, n consecutive bits can form $2^n$ combinations. For example, 4 bits can form 16 combinations. Some of these combinations are used to represent specific meanings and the remaining combinations are not used temporarily. Here, the reserved bit refer to one of the unused remaining combinations.

In step 603a, the terminal receives, in a first period, the SSB sent by the access network device.

When the terminal does not reside on or access a certain cell, for example, when the terminal is just powered on, the terminal can receive the SSB. The first period may be a first period when the terminal starts to receive signals after the terminal is powered on. In this case, the terminal needs to perform blind detection until the SSB is received.

After receiving the SSB, the terminal can analyze the SSB, and achieve time and frequency synchronization with the access network device based on the PSS and the SSS in the SSB. The terminal can use the DMRS in the SSB to decode the PBCH to obtain the system information carried on the PBCH. The system information is the system information required by the terminal to access the access network device. After the terminal achieves the synchronization with the access network device, the terminal can determine the indexes of the SSB candidate positions where the SSB is received.

In step 604a, the terminal obtains the configuration information from the received SSB.

Related descriptions of the configuration information can refer to the step 601a. After obtaining the configuration information, the terminal can determine the distribution of the SSB candidate positions in each period i.e., determine all the SSB candidate positions, which may be the distribution as illustrated in FIG. 2 or FIG. 3.

In step 605a, the terminal obtains the RMSI based on the received SSB.

Due to the limited capacity of the PBCH, the system information included in the SSB is a part of all the system information required by the terminal to randomly access the access network device, and this part of all the system information includes a master information block (MIB). Another part of all the system information required by the terminal to access the access network device is included in the RMSI. The RMSI is periodically sent by the access network device, and the RMSI is transmitted through the PDSCH. Therefore, in order to achieve initial access, the terminal also needs to obtain the RMSI in the PDSCH based on the indication information in the SSB. After the terminal obtains the system information in the SSB and the RMSI, the terminal can access the network based on the system information in the SSB and the RMSI.

However, since obtaining of the RMSI through analysis may not success at one time, i.e., there is a case that obtaining of the RMSI fails. In this case, the RMSI needs to be saved, and the step 606b is executed.

In step 606a, the terminal determines the signal detection position in a second period based on the obtained configuration information.

In this step 606a, based on the obtained configuration information, the distribution of the SSB candidate positions is determined, and all SSB candidate positions are used as the signal detection positions in the second period.

In step 607a, the terminal detects the SSB in the second period based on the determined signal detection positions.

That is, the terminal sequentially detects the SSB at the SSB candidate positions that are used as the signal detection positions in the second period.

Optionally, the RMSI may also include related information of the SSBs, such as the number of the SSBs, sent by the access network device in the SSB period. For example, a bitmap in the RMSI in the NR technology can be used to represent the number. The bitmap includes multiple bits, and the number of consecutive 1 in this series of bits is the number of the SSBs. Since the number of SSBs is equal to the number of beams, the number of SSBs is equal to the value of the QCL parameter. For example, this series of bits is 11110000, which represents that SSBs 0-3 are sent by the access network device but the SSBs 4-7 are not sent in the NR technology. In embodiments of the disclosure, it means that the access network device sends 4 SSBs, i.e., the value of the QCL parameter is 4. By including the number of SSBs sent by the access network device in the SSB period in the RMSI, after receiving the RMSI, the terminal can know the number of SSBs sent by the access network device in the SSB period, and perform rate matching based on the number.

In step 608a, if the terminal detects an SSB at any SSB candidate position, the terminal determines the PDCCH associated with the RMSI based on the SSB candidate positions where the SSBs are detected in the second period.

Since there is an association relationship between the PDCCH associated with the RMSI and the time domain position of the SSB, that is, the time domain position of the CORESET where the PDCCH associated with the RMSI is located is the same as the SSB candidate position where the SSB is detected in the second period, the time domain position of Control Resource SET #0 (CORESET #0) where the PDCCH associated with the RMSI is located is determined without analyzing the SSB, and the PDCCH associated with the RMSI is found through searching the CORESET #0. Here, the PDCCH associated with RMSI refers to the PDCCH that carries the control information of the RMSI.

Optionally, obtaining the PDCCH associated with the RMSI includes: combining and decoding the PDCCH obtained in the step 508a and the PDCCH obtained in the step 505a. Optionally, the combining of the PDCCHs may adopt soft combining, which is not limited in the disclosure. The combining and decoding of PDCCHs can improve the efficiency of obtaining the control information in the PDCCH when the channel quality is not good.

Optionally, before the combining and decoding of PDCCHs, the method may further include: performing independent decoding on the PDCCH acquired in the second period, performing the combining and decoding of PDCCHs if the decoding fails, and not performing the combining and decoding of PDCCHs if the decoding of PDCCHs is successful.

It is to be noted that if the decoding of the PDCCHS still fails in the step 508a, the SSB candidate positions that are the same as the signal detection positions in the second period can be used as the signal detection positions in a third period, and steps 507a and 508a are repeated in the third period. If the decoding of the PDCCHs succeeds in the third period, the step 509a may be executed.

In step 609a, the RMSI is obtained based on the PDCCH.

The PDCCH carries the control information indicating a PDSCH where the RMSI is located. Therefore, the step 509a includes: obtaining the control information in the PDCCH from the PDCCH, and obtaining the RMSI from the corresponding PDSCH based on the control information.

In some embodiments of the disclosure, by carrying, in the SSB, the configuration information used to indicate that there is an SSB candidate position in one time slot or the configuration information used to indicate that there are two SSB candidate positions in one time slot, after the terminal receives the SSB and achieves the synchronization with the access network device based on the received SSB, the distribution of the SSB candidate positions is determined based on the configuration information, that is, the signal detection positions are determined. In subsequent periods, the SSB can be received by detecting the SSBs only at the corresponding signal detection positions. Compared with detecting the signal in each period based on one of the two distributions of the SSB candidate positions that includes more SSB candidate positions, the number of times of detecting the signal by the terminal is effectively reduced and the power consumption of the terminal is reduced.

Figure 7:
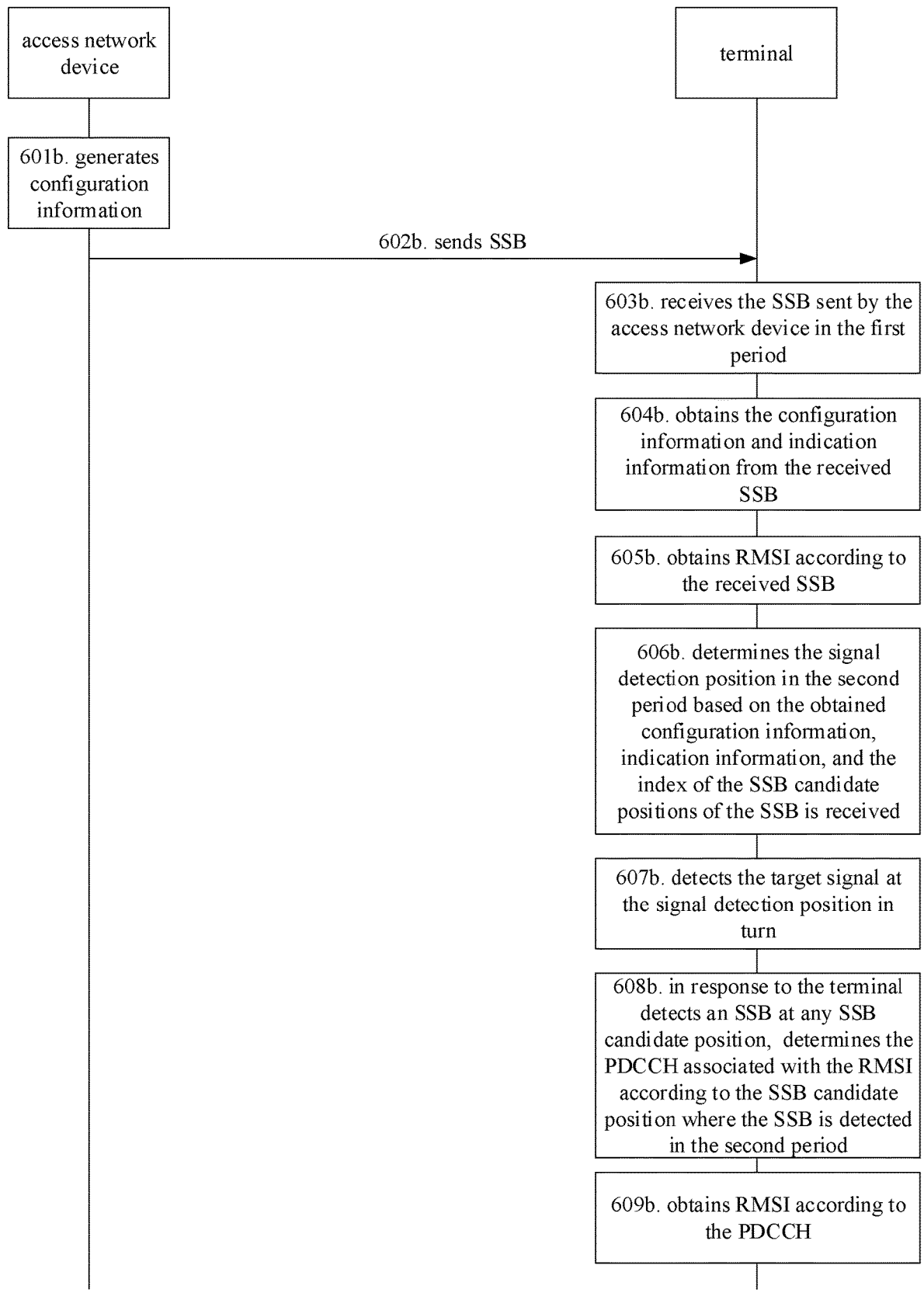
FIG. 7 is a flowchart illustrating a method for transmitting information according to an embodiment.

FIG. 7 is a flowchart illustrating a method for transmitting information according to an embodiment. As illustrated in FIG. 7, the method includes the following.

In step 601b, the access network device generates the configuration information.

The configuration information is used to indicate that there is a SSB candidate position in a time slot or the configuration information is used to indicate that there are two SSB candidate positions in a time slot. The SSB candidate position is the time domain position that the access network device might send the SSB.

In step 602b, the access network device sends the SSB.

The PBCH of the SSB carries the configuration information generated in the step 601b.

Related descriptions of the configuration information can refer to the step 602a.

Optionally, the PBCH of the SSB may also carry the indication information. The indication information is used to indicate the value of the QCL parameter.

In some embodiments of the disclosure, the value of the QCL parameter may correspond to a value of the QCL parameter that may be used by the access network device one by one. For example, the value of the QCL may be equal to the number of beams, and thus the indication information may also be used to indicate the number of beams. That is, the value of the QCL parameter is used to indicate the number of beams or is associated with the number of beams. For example, the value of the QCL parameter adopted by the access network device (that is, the selectable value of the QCL parameter) may be {1, 2, 4, or 8}, or {2, 4, or 8}.

In a possible implementation, the indication information is used to indicate the value of the QCL parameter adopted by the access network device. Optionally, the value of the QCL parameter adopted by the access network device belongs to a first set of selectable values and the value of the QCL parameter indicated by the indication information belongs to a second set of selectable values. Herein, the first set of selectable values represents values of the QCL parameter that can be adopted by the access network device and the second set of selectable values represents the values of the QCL parameter that can be indicated by the indication information. The number of elements in the first set of selectable values is n, where n is greater than or equal to 2, the number of elements in the second set of selectable values is (n−1), and the second set of selectable values is a subset of the first set of selectable values. As an example, the first set of selectable values is {1, 2, 4, 8}, and the elements in the second set of selectable values are any three of 1, 2, 4, and 8. As another example, the first set of selectable values is {2, 4, 8}, and the elements in the second set of selectable values are any two of 2, 4, and 8.

In some embodiments, the configuration information is represented by a bit of the PBCH that is used to indicate the RMSI SCS in the NR technology, or the configuration information is represented by a reserved bit in the PBCH. In the PBCH, n consecutive bits can form $2^n$ combinations. For example, 4 bits can form 16 combinations. A part of these combinations are used to represent specific meanings, and the remaining combinations are not used temporarily. The reserved bit refers to one of the remaining combinations that are not used.

In a possible implementation, the indication information is configured to indicate whether the value of the QCL parameter adopted by the access network device belongs to the first set or the second set. The intersection between the first set and the second set is empty.

In the implementation, the indication information indicating that the value of the QCL parameter adopted by the access network device belongs to the first set is called first indication information and the indication information indicating that the value of the QCL parameter adopted by the access network device belongs to the second set is called second indication information. Accordingly, the method may further include: generating the first indication information if the value of the QCL parameter adopted by the access network device belongs to the first set, or generating the second indication information if the value of the QCL parameter adopted by the access network device belongs to the second set. The intersection between the first set and the second set is empty.

For example, the first indication information and the second indication information can be represented by a single bit. That is, different values of a bit can represent different indication information. As an example, the value 0 represents the first indication information and the value 1 represents the second indication information. As another example, the value 1 represents the first indication information and the value 0 represents the second indication information.

In an example, the configuration information is represented by a bit of the PBCH in the NR technology, where the bit is used to indicate the RMSI SCS, or the configuration information is represented by a reserved bit in the PBCH. In another example, the configuration information is represented by a reserved bit in the PBCH, and the indication information is represented by the bit of the PBCH of the NR technology, where the bit is used to indicate the RMSI SCS.

In a possible implementation, the first set is {8}, and the second set is {1, 2, 4}.

The number of SSBs sent by the access network device in a period is the same as the number of beams used. Therefore, when the number of beams used by the access network device is 1, the number of sent SSBs is 1. When the number of beams used by the access network device is 2, the number of sent SSBs is 2. When the number of beams used by the access network device is 4, the number of sent SSBs is 4. When the number of beams used by the access network device is 8, the number of sent SSBs is 8.

For example, the position where the access network device sends the SSB may also be related to the value of the QCL parameter and/or the number of beams used by the access network device. That is, different SSB candidate positions correspond to different beams. The SSB candidate positions corresponding to one beam are regarded as a SSB candidate position set. The results obtained by performing a certain operation on indexes of the SSB candidate positions in the SSB candidate position set and the value of the QCL parameter indicated by the indication information are the same. For example, when two SSB candidate positions are included in one time slot, the modulo operation can be performed on the indexes of the SSB candidate positions and the value of the QCL parameter indicated by the indication information. When one SSB candidate position is included in a time slot, the modulo operation is performed on the value of the QCL parameter indicated by the indication information and the half of the indexes of the SSB candidate positions. The modulo operation refers to dividing the index of the SSB candidate position by the value of the QCL parameter to obtain a remainder as the result of the modulo operation.

For example, when two SSB candidate positions are included in one time slot, if the indication information is the first indication information and the first set is {8}, the results obtained by performing the modulo operation on the indexes of the SSB candidate positions in the same SSB candidate position set and 8 (i.e., the value of the QCL parameter indicated by the first indication information) are the same. If the indication information is the second indication information and the second set is {1, 2, 4}, the results obtained by performing the modulo operation on the indexes of the SSB candidate positions in the same SSB candidate position set and 4 (i.e., the value of QCL parameter indicated by the second indication information) are the same.

For example, the step 602a can include: when the access network device monitors that channel is idle, sending the SSB at a first SSB candidate position through a first beam within an SSB period. The first beam is one of the at least one beam used by the access network device, each beam corresponds to a different SSB candidate position set, each SSB candidate position set includes at least one SSB candidate position, and each beam is used for sending the SSB at the SSB candidate positions in the corresponding SSB candidate position set.

Optionally, the step 602a may also include: if it is monitored that the channel is occupied, the access network device attempts to send the SSB after an interval of (n−1) SSB candidate positions within the SSB period, where n equals to the value of the QCL parameter indicated by the indication information; or if it is monitored that the channel is occupied, the access network device attempts to send the SSB again at a next SSB candidate position within the SSB period.

That is, within a SSB period, the access network device attempts to send the SSB at the SSB candidate position 0 until the SSB is successfully sent. Here, attempting to send the SSB at the SSB candidate position means performing channel monitoring, sending the SSB using the beam corresponding to the SSB candidate position at the SSB candidate position if the channel is not occupied (i.e., the channel is idle), performing the channel monitoring before a next SSB candidate position or an SSB candidate position after an interval of a preset number of SSB candidate positions comes if the channel is occupied, and sending the SSB using the beam corresponding to the next SSB candidate position at the next SSB candidate position if the channel is not occupied. The preset number may be (n−1), where n equals to the value of the QCL parameter indicated by the indication information.

If the value of the QCL parameter adopted by the access network device is 4 or 8, within one SSB period, the access network device attempts to send the SSB at multiple consecutive SSB candidate positions in sequence until the sending of the SSB succeeds. That is, if it is monitored that the channel is occupied, the SSB is sent at the next SSB candidate position.

For example, as illustrated in FIG. 2, taking the SCS being 30 KHz as an example, there are 20 SSB candidate positions within 5 ms. These 20 SSB candidate positions having serial numbers in ascending order starting from 0.

If the value of the QCL parameter adopted by the access network device is 8, the access network device attempts to send the SSB0 at the SSB candidate position 0 for the first time. If the channel is not occupied, the sending of the SSB0 at the SSB candidate position 0 succeeds, the sending of the SSB1 at the SSB candidate position 1 succeeds, . . . , and the sending of the SSB7 at the SSB candidate position 7 succeeds. If the channel is occupied, the access network device attempts to send the SSB1 at the SSB candidate position 1. If the channel is not occupied, the sending of the SSB1 at SSB candidate position 1 succeeds, the sending of the SSB2 at the SSB candidate position 2 succeeds, . . . , and the sending of the SSB0 at the SSB candidate position 8 succeeds. If the channel is occupied, the access network device attempts to send the SSB2 at the SSB candidate position 2, and the subsequent processes are similar to the above processes, which are omitted herein.

If the value of the QCL parameter adopted by the access network device is 4, the access network device attempts to send the SSB0 at the SSB candidate position 0 for the first time. If the channel is not occupied, the sending of the SSB0 at the SSB candidate position 0 succeeds, the sending of the SSB1 at the SSB candidate position 1 succeeds, . . . , and the sending of the SSB3 at the SSB candidate position 3 succeeds. If the channel is occupied, the access network device attempts to send the SSB1 at the SSB candidate position 1. If the channel is not occupied, the sending of the SSB1 at the SSB candidate position 1 succeeds, the sending of the SSB2 at the SSB candidate position 2 succeeds, . . . , and the sending of the SSB0 at the SSB candidate position 4 succeeds. If the channel is occupied, the access network device attempts to send the SSB2 at the SSB candidate position 2, and the subsequent processes are similar to the previous processes, which are omitted herein.

If the value of the QCL parameter used by the access network device is 1 or 2, that is, the value of the QCL parameter used by the access network device belongs to the second set, the indication information sent by the access network device is the second indication information, i.e., the value of the QCL parameter indicated by the second indication information is 4. In one SSB period, the access network device attempts to send the SSB at multiple SSB candidate positions at an interval of 3 candidate positions, until SSB is sent successfully.

Taking the SCS being 30 KHz as an example, there are 20 SSB candidate positions within 5 ms. These 20 SSB candidate positions have the serial numbers in ascending order starting from 0.

If the value of the QCL parameter adopted by the access network device is 2, the access network device attempts to send the SSB0 at the SSB candidate position 0 for the first time. If the channel is not occupied, the sending of the SSB0 at the SSB candidate position 0 succeeds and the sending of the SSB1 at the SSB candidate position 1 succeeds. If the channel is occupied, the access network device attempts to send the SSB0 at the SSB candidate position 4. If the channel is not occupied, the sending of the SSB0 at the SSB candidate position 4 succeeds and the sending of the SSB1 at the SSB candidate position 5 succeeds. If the channel is occupied, the access network device attempts to send the SSB0 at the SSB candidate position 8, and the subsequent processes are similar to the above processes, which are omitted herein. It can be seen that the SSB candidate positions where the SSB0 is sent are the SSB candidate position 0, the SSB candidate position 4, the SSB candidate position 8, the SSB candidate position 12, and the SSB candidate position 16. There are 3 SSB candidate positions between the SSB candidate position 0 and the SSB candidate position 4, and there are 3 SSB candidate positions between the SSB candidate position 4 and the SSB candidate position 8.

If the value of the QCL parameter adopted by the access network device is 1, the access network device attempts to send the SSB0 at the SSB candidate position 0 for the first time. If the channel is not occupied, the sending of the SSB0 at the SSB candidate position 0 succeeds. If the channel is occupied, the access network device attempts to send the SSB0 at the SSB candidate position 4. If the channel is not occupied, the sending of the SSB0 at the SSB candidate position 4 succeeds. If the channel is occupied, the access network device attempts to send the SSB0 at the SSB candidate position 8, and the subsequent processes are similar to the above processes, which are omitted here. It can be seen that the SSB candidate positions where the SSB0 is sent are the SSB candidate position 0, the SSB candidate position 4, the SSB candidate position 8, the SSB candidate position 12, and the SSB candidate position 16. There are 3 SSB candidate positions between the SSB candidate position 0 and the SSB candidate position 4 and there are 3 SSB candidate positions between the SSB candidate position 4 and the SSB candidate position 8. That is, the predetermined interval is 3 SSB candidate positions.

In related arts, when the value of the QCL parameter adopted by the access network device is 1 or 2, if the sending of the SSB at one SSB candidate position fails, the SSB can be sent at a next SSB candidate position. It can be seen that, compared with the related arts, in embodiments of the disclosure, when the QCL parameter used by the access network device is 1 or 2, if a current channel is occupied, the access network device attempts to send the SSB again at the interval of 3 SSB candidate positions.

It is to be noted that in another possible implementation, when the value of the QCL parameter adopted by the access network device is 1 or 2, in one period, the access network device may attempt to send the SSB at multiple consecutive SSB candidate positions in sequence until the sending of the SSB succeeds. That is, the same method in the related art is adopted.

For example, when one SSB candidate position is included in a time slot, if the indication information is the first indication information and the first set is {8}, the results obtained by performing the modulo operation on the half of the indexes of the SSB candidate positions in the same SSB candidate position set and 8 (i.e., the value of the QCL parameter indicated by the first indication information) are the same. If the indication information is the second indication information and the second set is {1, 2, 4}, the results obtained by performing the modulo operation on the half of the indexes of the SSB candidate positions in the same SSB candidate position set and 4 (i.e., the value of the QCL parameter indicated by the second indication information) are the same.

It is to be noted that, in embodiments of the disclosure, if one time slot includes two SSB candidate positions, the SSBn represents the SSB sent through the $(n-1)^{th}$ beam. For example, SSB0 represents to the SSB sent through the first beam, the SSB1 represents the SSB sent through the second beam, and so on. If one time slot includes an SSB candidate position, SSB2n represents the SSB sent through the $(n-1)^{th}$ beam. For example, the SSB0 represents the SSB sent through the first beam, the SSB2 represents the SSB sent through the second beam, and so on.

In step 603b, the terminal receives the SSB sent by the access network device within the first period.

The SSB carries the configuration information and the indication information, and the indication information is used to indicate the QCL parameter.

If the terminal does not reside on or access a certain cell, for example, when the terminal is just powered on, the terminal can receive the SSB. The first period may be a first period when the terminal starts to receive signals after the terminal is powered on. In this case, the terminal needs to perform blind detection until the SSB is received. The first period refers to a transmission period of a discovery reference signal defaulted by the terminal.

After receiving the SSB, the terminal can analyze the SSB and achieves time and frequency synchronization with the access network device based on the PSS and the SSS in the SSB. The terminal can use the DMRS in the SSB to decode the PBCH to obtain the system information carried on the PBCH. The system information is the system information required by the terminal to access the access network device. After the terminal and the access network device achieve the synchronization, the terminal can determine the indexes of the SSB candidate positions where the SSB is received.

In step 604b, the terminal obtains the configuration information and the indication information from the received SSB.

Related descriptions of the configuration information and the indication information can refer to the step 601a. After obtaining the configuration information, the terminal can determine the distribution of the SSB candidate positions, i.e., the time domain positions corresponding to the SSB candidate positions.

In step 605b, the terminal obtains the RMSI based on the received SSB.

Due to the limited capacity of the PBCH, the system information included in the SSB is only a part of all the system information required by the terminal to randomly access the access network device. This part can include the master information block (MIB). Another part of all the system information required by the terminal to access the access network device is included in the RMSI. The RMSI is periodically sent by the access network device, and the RMSI is transmitted through the PDSCH. Therefore, in order to achieve initial access, the terminal also needs to determine the time domain position of the CORESET where the PDCCH associated with the RMSI is located based on the time domain position corresponding to the SSB, search for the PDCCH associated with the RMSI in the CORESET, and obtain the RMSI in the PDSCH based on the control information in the searched PDCCH. After obtaining the system information in the SSB and the RMSI, the terminal can access the network based on the system information in the SSB and the RMSI. Here, the PDCCH associated with the RMSI refers to the PDCCH that carries the control information of the RMSI.

Optionally, after obtaining the PDCCH, the control information of the RMSI may not be obtained through the analysis from the PDCCH. In this case, the previously obtained control information of the RMSI needs to be saved, and the step 606b is executed.

In step 606b, the terminal determines the signal detection positions in the second period based on the obtained configuration information, the indication information, and the indexes of the SSB candidate positions of the received SSBs.

The step 606b may include the following.

First, the SSB candidate positions are determined based on the obtained configuration information.

Second, the SSB candidate position set related to the number of beams is determined based on the indication information and the distribution of the SSB candidate positions. Each SSB candidate position set includes at least one SSB candidate position.

Third, all SSB candidate positions in a SSB candidate position set to which the indexes of the SSB candidate positions where the SSB is received belong are determined as signal detection positions in the second period.

If the configuration information indicates that there are two SSB candidate positions in one time slot and the first set is {8}, the results obtained by performing the modulo operation on the indexes of all SSB candidate positions in the SSB candidate position set and 8 equal to each other. In this way, multiple SSB candidate position sets are obtained, and all SSB candidate positions in the SSB candidate position set to which the first SSB candidate position belongs are determined as signal detection positions in the second period. For example, if the first SSB candidate position where the SSB is received in the first period is the SSB candidate position 0, the signal detection positions in the second period are the SSB candidate position 0, the SSB candidate position 8, and the SSB candidate position 16. If the first SSB candidate position where the SSB is received in the first period is the SSB candidate position 1, the signal detection positions in the second period are the SSB candidate position 1, the SSB candidate position 9 and the SSB candidate position 17. If the first SSB candidate position where the SSB is received in the first period is the SSB candidate position 8, the signal detection positions in the second period are the SSB candidate position 0, the SSB candidate position 8 and the SSB candidate position 16. If the first SSB candidate position where the SSB is received in the first period is the SSB candidate position 5, the signal detection positions in the second period are the SSB candidate position 5 and the SSB candidate position 13. At each signal detection position, the terminal performs the detection once. If the indication information is the first indication information, the terminal only needs to perform the detection for two or three times in the next period.

If the configuration information indicates that there are two SSB candidate positions in one slot and the second set is {1, 2, 4}, the results obtained by performing the modulo operation on the indexes of all SSB candidate positions in the SSB candidate position set and 4 are equal to each other. Therefore, multiple SSB candidate position sets can be obtained, and all SSB candidate positions in the SSB candidate position set to which the first SSB candidate position belongs are determined as signal detection positions in the second period. For example, if the first SSB candidate position where the SSB is received in the first period is the SSB candidate position 0, the signal detection positions in the second period are the SSB candidate position 0, the SSB candidate position 4, the SSB candidate position 8, the SSB candidate position 12, and the SSB candidate position 16. If the first SSB candidate position where the SSB is received in the first period is the SSB candidate position 8, the signal detection positions in the second period are the SSB candidate position 1, the SSB candidate position 8, and the SSB candidate position 16. If the first SSB candidate position where the SSB is received in the first period is the SSB candidate position 5, the signal detection positions in the second period are the SSB candidate position 5 and the SSB candidate position 13. At each signal detection position, the terminal performs the detection once. If the indication information is the second indication information, the terminal only needs to perform the detection for 5 or 6 times in a next period.

Compared with the detection at all SSB candidate positions in the related arts (that is, the detection needs to be performed for 20 times at the 20 SSB candidate positions), the above two solutions can significantly reduce the number of times of detecting a signal by the terminal.

If the configuration information indicates that there is an SSB candidate position in a time slot and the first set is {8}, the results obtained by performing the modulo operation on the half of the indexes of the SSB candidate positions in a SSB candidate position set and 8 equal to each other. Therefore, multiple SSB candidate position sets can be obtained, and all SSB candidate positions in the SSB candidate position set to which the first SSB candidate position belongs are determined as signal detection positions in the second period. For example, if the second SSB candidate position where the SSB is received in the first period is the SSB candidate position 0, the signal detection positions in the second period are the SSB candidate position 0 and the SSB candidate position 16. If the second SSB candidate position where the SSB is received in the first period is the SSB candidate position 2, the signal detection positions in the second period are the SSB candidate position 2 and the SSB candidate position 17. If the second SSB candidate position where the SSB is received in the first period is the SSB candidate position 4, the signal detection position in the second period is the SSB candidate position 4. If the first SSB candidate position where the SSB is received in the first period is the SSB candidate position 6, the signal detection position in the second period is the SSB candidate position 6, and so on. At each signal detection position, the terminal performs the detection for one time. When the configuration information indicates that there is one SSB candidate position in one time slot and the indication information is the first indication information, the terminal only needs to perform the detection for 1 or 2 times within a next period.

If the configuration information indicates that there is one SSB candidate position in one time slot and the second set is {1, 2, 4}, the results obtained by performing the modulo operation on 4 and the half of the indexes of the SSB candidate positions in the SSB candidate position set equal to each other. Therefore, multiple SSB candidate position sets can be obtained and all SSB candidate positions in the SSB candidate position set to which the first SSB candidate position belongs are determined as signal detection positions in the second period. For example, if the second SSB candidate position where the SSB is received in the first period is the SSB candidate position 0, the signal detection positions in the second period are the SSB candidate position 0, the SSB candidate position 8, and the SSB candidate position 16. If the second SSB candidate position where the SSB is received in the first period is the SSB candidate position 2, the signal detection positions in the second period are the SSB candidate position 2, the SSB candidate position 10, and the SSB candidate position 18. If the second SSB candidate position of the SSB received in the first period is the SSB candidate position 4, the signal detection positions in the second period are the SSB candidate position 4 and the SSB candidate position 12. If the first SSB candidate position where the SSB is received in the first period is the SSB candidate position 6, the signal detection positions in the second period are the SSB candidate position 6 and the SSB candidate position 14. At each signal detection position, the terminal performs the detection for one time. When the configuration information indicates that there is one SSB candidate position in one time slot and the indication information is the second indication information, the terminal only needs to perform the detection for 2 or 3 times within a next period.

Compared with the detection at all SSB candidate positions in the related art (that is, it needs to perform the detection for 10 times at the 10 SSB candidate positions), both of the above two situations can significantly reduce the number of times of detecting the signal by the terminal.

It is to be noted that the indication information is used to indicate whether the value of the QCL parameter adopted by the base station belongs to the first set or the second set, and there are two manners to divide the determined SSB candidate position set (i.e., one is for the first set and the other one is for the second set). In the case where the indication information is used to indicate the value of the QCL parameter used by the base station, the manner for dividing the SSB candidate position set determined by the terminal may be the same as the number of elements in the first set of selectable values. The process for the terminal to determine the SSB candidate positions set is the same as the foregoing process, and detailed descriptions are omitted herein.

In step 607*b*, the terminal detects a target signal at the signal detection positions sequentially.

That is, the SSB is sequentially detected at each SSB candidate position that is determined as the signal detection position, in ascending order of indexes of the SSB candidate positions.

The signals received at the SSB candidate positions in the same SSB candidate position set are the signal of the QCL. The signal of the QCL refers to a signal with the same large-scale characteristics. Large-scale characteristics include, but are not limited to, delay spread, Doppler spread, Doppler shift, average channel gain, and average delay.

Optionally, the RMSI may further include related information of the SSB sent by the access network device in each period, such as the number of SSBs. For example, a bitmap in the RMSI in the NR technology can be used to represent the number of SSBs. The bitmap includes multiple bits, and the number of consecutive bits of 1 in this series of bits is the number of SSBs. Since the number of SSBs is equal to the number of beams, the number of SSBs is also equal to the value of the QCL parameter. For example, this series of bits is 11110000, which means that SSBs 0-3 are sent but the SSBs 4-7 are not sent in the NR technology. In embodiments of the disclosure, it means that the access network device sent 4 SSBs, that is, the value of the QCL parameter is 4. By including the number of SSBs sent by the access network device in the SSB period in the RMSI, after receiving the RMSI, the terminal can know the number of SSBs sent by the access network device in the SSB period, and perform rate matching based on the number.

In step 608b, if the terminal detects the SSB at any SSB candidate position, the PDCCH associated with the RMSI is determined based on the SSB candidate position where the SSB is detected in the second period.

Since there is an association relationship between the PDCCH associated with the RMSI and the time domain position of the SSB, that is, the time domain position of the CORESET where the PDCCH associated with the RMSI is located is the same as the SSB candidate position where the SSB is detected in the second period, the time domain position of CORESET0 where the PDCCH associated with RMSI is located can be determined without analyzing the SSB, and the PDCCH associated with RMSI is searched for in CORESET0. Here, the PDCCH associated with the RMSI refers to the PDCCH carrying the control information of the RMSI.

Optionally, obtaining the PDCCH associated with the RMSI includes: combining and decoding the PDCCH obtained in the step 608b and the PDCCH obtained in the step 605b. Optionally, the combining of PDCCHs may adopt the soft combining, which is not limited in the disclosure. The combining and decoding of PDCCHs can improve the efficiency of obtaining the control information in the PDCCH when the channel quality is not good.

Optionally, before combining and decoding the PDCCHs, the method may further include performing independent decoding on the PDCCH acquired in the second period, performing the combining and decoding of the PDCCHs if the decoding fails; and not performing the combining and decoding if the decoding succeeds.

It is to be noted that if the decoding of the PDCCH in the step 608a still fails, the SSB candidate positions that are the same with the signal detection positions in the second period can be used as the signal detection positions in the third period, and the steps 607a and 608a are performed in the third period. If the decoding of the PDCCH succeeds in the third period, the step 609a may be executed.

In step 609a, the RMSI is obtained based on the PDCCH. The implementation of this step can refer to the step 609a.

In some embodiments of the disclosure, by carrying, in the SSB, the configuration information used to indicate that there is one SSB candidate position in one time slot or the configuration information used to indicate that there are two SSB candidate positions in one time slot, after the terminal receives the SSB and achieves synchronization with the access network device based on the received SSB, the distribution of the SSB candidate positions can be determined based on the configuration information. That is, after determining the signal detection positions, in the subsequent periods, the SSB can be received by detecting the SSB only at the corresponding signal detection positions. Compared with detecting the signal in each period based on one having more number of SSB candidate positions in the two distributions of the SSB candidate positions, this method can effectively reduce the number of times of detecting a signal by the terminal.

In addition, in embodiments of the disclosure, by carrying the indication information in the SSB, the terminal can know the QCL parameter adopted by the access network device. Based on the value of the QCL parameter indicated by the indication information and the SSB candidate position where the SSB is received by the terminal at the first time, the terminal can determine the signal detection positions in a next period, such that the terminal only needs to detect the SSB at a part of the SSB candidate positions in the next period, thereby further reducing the number of times of detecting a signal by the terminal.

By multiplexing the existing bits of the PBCH in the NR technology to carry the indication information, there is no need to increase the load of the PBCH, and it is compatible with the NR technology.

Figure 8:
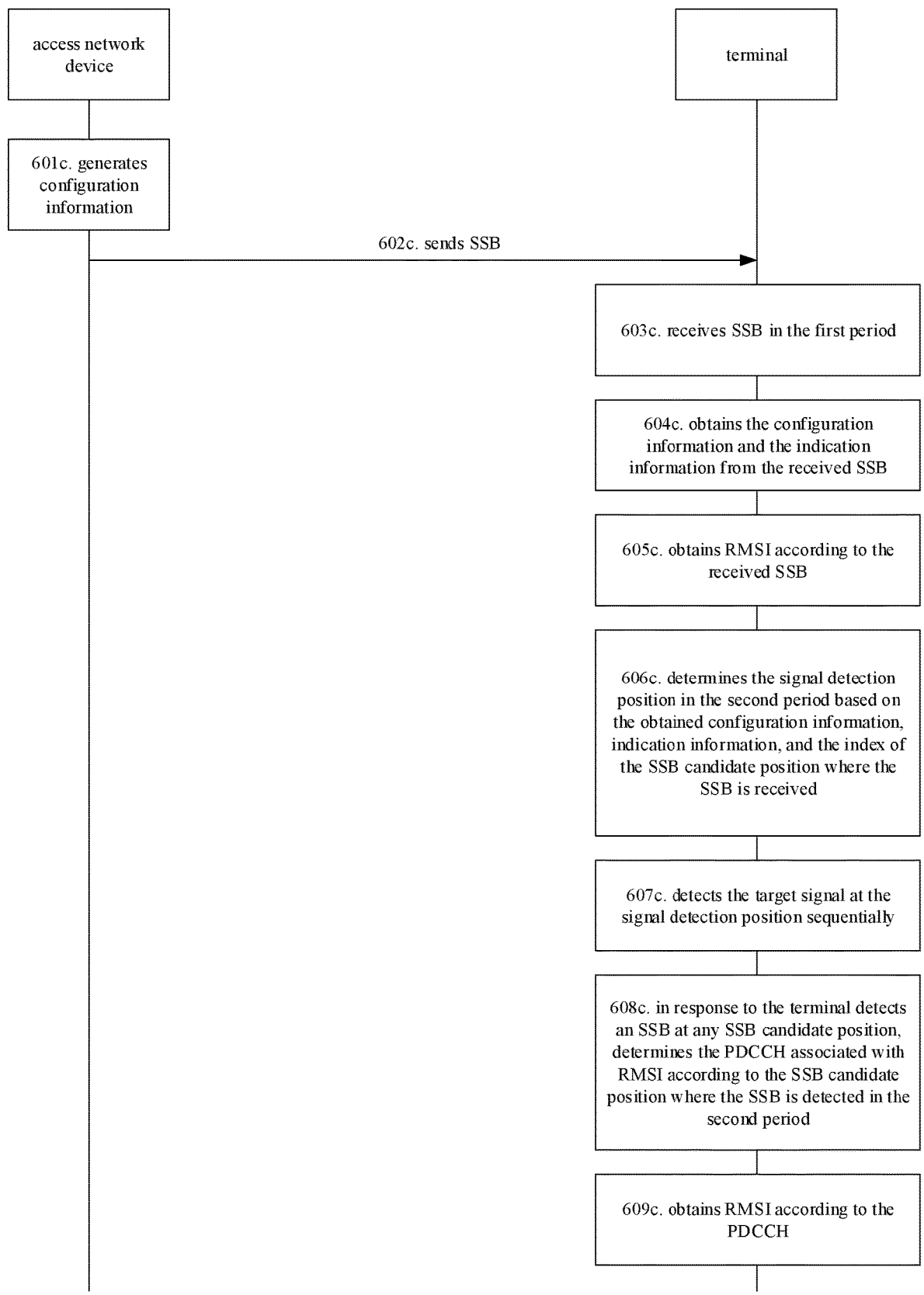
FIG. 8 is a flowchart illustrating a method for transmitting information according to an embodiment.

FIG. 8 is a flowchart of a method for transmitting information according to an embodiment. As illustrated in FIG. 8, the method includes the following.

In step 601c, the access network device generates the configuration information.

Related descriptions of the configuration information can refer to the step 601b.

In step 602c, the access network device sends the SSB. The PBCH of the SSB carries the configuration information and the indication information, and the indication information is used to indicate the QCL parameter.

Related descriptions of the configuration information can refer to the step 602a.

In some embodiments, the indication information is used to indicate whether the value of the QCL parameter used by the access network device belongs to the first set or the second set. The intersection set between the first set and the second set is empty.

The first set is $\{4, 8\}$ and the second set is $\{1, 2\}$. The value of the QCL parameter indicated by the first indication information is 4 and the value of the QCL parameter indicated by the second indication information is 1. That is, the value of the QCL parameter indicated by the first indication information may be different from the value of the QCL parameter actually used by the access network device, and the value of the QCL parameter indicated by the second indication information may be different from the value of the QCL parameter actually used by the access network device.

For example, the step 602c may include: within one SSB period, when the access network device monitors that the channel is idle, sending the SSB at the first SSB candidate position through the first beam. The first beam is one of at least one beam used by the access network device. Each beam corresponds to a different SSB candidate position set. Each SSB candidate position set includes at least one SSB candidate position. Each beam is used to transmit the SSB at the SSB candidate positions in the corresponding SSB candidate position set.

For example, the step 602c may further include: within the SSB period, if monitoring that the channel is occupied, the access network device attempts to send the SSB again at a next SSB candidate position.

For example, when the two SSB candidate positions are included in one time slot, for example, if the indication information is the first indication information and the first set is $\{4, 8\}$, the results obtained by performing the modulo operation on the indexes of the SSB candidate positions in a SSB candidate position set and 4 (i.e., the value of the QCL parameter indicated by the first indication information) equal to each other. If the indication information is the second indication information and the second set is $\{1, 2\}$, the results obtained by performing the modulo operation on the indexes of the SSB candidate positions in a SSB candidate position set and 1 (i.e., the value of QCL parameter indicated by the second indication information) equal to each other.

If the value of the QCL parameter adopted by the access network device is 4 or 8, within a period, the access network device attempts to send the SSB sequentially at multiple consecutive SSB candidate positions until the sending of the SSB succeeds. Here, attempting to send the SSB at the SSB candidate positions means performing channel monitoring, sending the SSB through a beam corresponding to the SSB candidate position at the SSB candidate position if the channel is not occupied (i.e., the channel is idle), performing the channel monitoring again before a next SSB candidate position comes if the channel is occupied, and sending the SSB through the beam corresponding to the next SSB candidate position at the next SSB candidate position if the channel is not occupied.

For example, as illustrated in FIG. 2, taking the SCS being 30 KHz as an example, there are 20 SSB candidate positions within 5 ms, and these 20 SSB candidate positions have serial numbers in ascending order starting from 0.

If the value of the QCL parameter adopted by the access network device is 8, the access network device attempts to send the SSB0 at the SSB candidate position 0 for the first time. If the channel is not occupied, the sending of the SSB0 at the SSB candidate position 0 succeeds, the sending of the SSB1 at the SSB candidate position 1 succeeds, . . . , and the sending of the SSB7 at the SSB candidate position 7 succeeds. If the channel is occupied, the access network device attempts to send the SSB1 at the SSB candidate position 1. If the channel is not occupied, the sending of the SSB1 at the SSB candidate position 1 succeeds, the sending of the SSB2 at the SSB candidate position 2 succeeds, . . . , and the sending of the SSB0 at the SSB candidate position 8 succeeds. If the channel is occupied, the access network device attempts to send the SSB2 at the SSB candidate position 2 and the subsequent processes are similar to the above processes, where are omitted herein.

If the value of the QCL parameter adopted by the access network device is 4, the access network device attempts to send the SSB0 at the SSB candidate position 0 for the first time. If the channel is not occupied, the sending of the SSB0 at the SSB candidate position 0 succeeds, the sending of the SSB1 at the SSB candidate position 1 succeeds, . . . , and the sending of the SSB3 at the SSB candidate position 3 succeeds. If the channel is occupied, the access network device attempts to send the SSB1 at the SSB candidate position 1. If the channel is not occupied, the sending of the SSB1 at the SSB candidate position 1 succeeds, the sending of the SSB2 at the SSB candidate position 2 succeeds, . . . , and the sending of the SSB0 at the SSB candidate position 4 succeeds. If the channel is occupied, the access network device attempts to send the SSB2 at the SSB candidate position 2 and the subsequent processes are similar to the above processes, which are omitted here.

If the value of the QCL parameter adopted by the access network device is 1 or 2, the access network device attempts to send the SSB sequentially at multiple SSB candidate positions at a predetermined interval within a period until the sending of the SSB succeeds. Here, attempting to send the SSB at the SSB candidate positions means performing channel monitoring, sending the SSB at the SSB candidate position if the channel is not occupied, performing the channel monitoring again before the SSB candidate position spaced by a predetermined interval (such as 3 SSB candidate positions) if the channel is occupied, and sending the SSB at a next second SSB candidate position if the channel is not occupied.

Taking the SCS being 30 KHz as an example, there are 20 SSB candidate positions within 5 ms, and these 20 SSB candidate positions have serial numbers in ascending order starting from 0.

If the value of the QCL parameter adopted by the access network device is 2, the access network device attempts to send the SSB0 at the SSB candidate position 0 for the first time. If the channel is not occupied, the sending of the SSB0 at the SSB candidate position 0 succeeds and the sending of the SSB1 at the SSB candidate position 1 succeeds. If the channel is occupied, the access network device attempts to send the SSB0 at the SSB candidate position 4. If the channel is not occupied, the sending of the SSB0 at the SSB candidate position 4 succeeds and the sending of the SSB1 at the SSB candidate position 5 succeeds. If the channel is occupied, the access network device attempts to send the SSB0 at the SSB candidate position 8 and the subsequent processes are similar to the above processes, which are omitted herein. It can be seen that, the SSB candidate positions where the SSB0 is sent are the SSB candidate position 0, the SSB candidate position 4, the SSB candidate position 8, the SSB candidate position 12, and the SSB candidate position 16. There are 3 SSB candidate positions between the SSB candidate position 0 and the SSB candidate position 4, and there are 3 SSB candidate positions between the SSB candidate position 4 and the SSB candidate position 8.

If the value of the QCL parameter adopted by the access network device is 1, the access network device attempts to send the SSB0 at the SSB candidate position 0 for the first time. If the channel is not occupied, the sending of the SSB0 at the SSB candidate position 0 succeeds. If the channel is occupied, the access network device attempts to send the SSB0 at the SSB candidate position 4. If the channel is not occupied, the sending of the SSB0 at the SSB candidate position 4 succeeds. If the channel is occupied, the access network device attempts to send the SSB0 at the SSB candidate position 8 and the subsequent processes are similar to the above processes, which are omitted herein. It can be seen that the SSB candidate positions where the SSB0 is sent are the SSB candidate position 0, the SSB candidate position 4, the SSB candidate position 8, the SSB candidate position 12, and the SSB candidate position 16. There are 3 SSBs between the SSB candidate position 0 and the SSB candidate position 4, and there are 3 SSB candidate positions between the SSB candidate position 4 and the SSB candidate position 8. That is, the predetermined interval is 3 SSB candidate positions.

In related arts, when the value of the QCL parameter adopted by the access network device is 1 or 2, if the sending of an SSB at an SSB candidate position fails, the access network device may attempt to send the SSB at a next SSB candidate position. It can be seen that, compared with the related art, in embodiments of the disclosure, when the QCL parameter used by the access network device is 1 or 2, if a current channel is occupied, the access network device attempts to send the SSB again with an interval of 3 SSB candidate positions, and thus the number of times of attempting to send the SSB by the access network device is reduced.

It is to be noted that, in another possible implementation, when the value of the QCL parameter adopted by the access network device is 1 or 2, the access network device may attempt to send the SSB at multiple consecutive SSB candidate positions in sequence within a period until the SSB is successfully sent.

For example, when one SSB candidate position is included in a time slot, if the indication information is the first indication information and the first set is {8}, the results obtained by performing the modulo operation on the half of the indexes of the SSB candidate positions in the same SSB candidate position set and 8 equal to each other. If the indication information is the second indication information and the second set is {1, 2, 4}, the results obtained by performing the modulo operation on the half of the indexes of the SSB candidate positions in the same SSB candidate position set and 4 equal to each other.

In step 603c, the terminal receives the SSB in the first period.

When the terminal does not reside on or access a certain cell, for example, when the terminal is just powered on, the terminal can receive the SSB. The first period may be a first period in which the terminal starts to receive signals after the terminal is powered on. In this case, the terminal needs to perform blind detection until the SSB is received.

After receiving the SSB, the terminal can analyze the SSB and achieve time and frequency synchronization with the access network device based on the PSS and the SSS in the SSB. The terminal can use the DMRS in the SSB to decode the PBCH to obtain the system information carried on the PBCH. The system information is the system information required by the terminal to access the access network device. After the terminal and the access network device are synchronized, the terminal can determine the indexes of the SSB candidate positions where the SSB is received.

The first period refers to a transmission period of a discovery reference signal defaulted by the terminal.

In step 604c, the terminal obtains the configuration information and the indication information from the received SSB.

Related descriptions of the configuration information and the indication information can refer to the step 601a. After obtaining the configuration information, the terminal can determine the distribution of the SSB candidate positions.

In step 605c, the terminal obtains the RMSI based on the received SSB.

Due to the limited capacity of the PBCH, the system information included in the SSB is only a part of all the system information required by the terminal to randomly access the access network device. This part can include the MIB, and the other part of all the system information required by the terminal to access the access network device is included in the RMSI. The RMSI is periodically sent by the access network device, and the RMSI is transmitted through the PDSCH. Therefore, in order to achieve initial access, the terminal also needs to determine the time domain position of the CORESET where the PDCCH associated with the RMSI is located based on the time domain position corresponding to the SSB, search for the PDCCH associated with the RMSI in the CORESET, and obtain the RMSI in the PDSCH based on the control information in the searched PDCCH. After the terminal obtains the system information in the SSB and the RMSI, the terminal can access the network based on the system information in the SSB and the RMSI. Herein, the PDCCH associated with RMSI refers to the PDCCH that carries the control information of the RMSI.

Optionally, after obtaining the PDCCH, the control information of the RMSI may not be obtained through analysis from the PDCCH. In this case, the previously obtained control information of the RMSI needs to be saved and the step 606c is executed.

In step 606c, the terminal determines the signal detection positions in the second period based on the obtained configuration information, the indication information, and the indexes of the SSB candidate positions where the SSB is received.

This step 606c may include the following.

First, a distribution of the SSB candidate positions is determined based on the obtained configuration information.

Second, the SSB candidate position sets related to the number of beams are determined based on the indication information and the distribution of the SSB candidate positions. Each SSB candidate position set includes at least one SSB candidate position.

Third, all SSB candidate positions in the SSB candidate position set to which the indexes of the SSB candidate positions where the SSB is received belong are determined as signal detection positions in the second period.

If the configuration information indicates that there are two SSB candidate positions in one time slot and the first set is {4, 8}, the results obtained by performing the modulo operation on the indexes of all SSB candidate positions in the SSB candidate position set and 4 (i.e., the value of the QCL parameter indicated by the first indication information) equal to each other. For example, if the first SSB candidate position where the SSB is received in the first period is the SSB candidate position 0, the signal detection positions in the second period are the SSB candidate position 0, the SSB candidate position 4, the SSB candidate position 8, the SSB candidate position 12, and the SSB candidate position 16. If the first SSB candidate position where the SSB is received in the first period is the SSB candidate position 8, the signal detection positions in the second period are the SSB candidate position 1, the SSB candidate position 8, and the SSB candidate position 16. If the first SSB candidate position where the SSB is received in the first period is the SSB candidate position 5, the signal detection positions in the second period are the SSB candidate position 5 and the SSB candidate position 13. At each signal detection position, the terminal performs the detection for once. If the indication information is the first indication information, the terminal only needs to perform the detection for 5 or 6 times in the next period.

If the configuration information indicates that there are two SSB candidate positions in one time slot and the second set is {1, 2, 4}, all the SSB candidate positions in the second period are determined as the signal detection positions.

Compared with performing the detection at all the SSB candidate positions (i.e., there needs to perform the detection for 20 times at the 20 SSB candidate positions) in the related arts, the number of times of detecting the signal by the terminal can be reduced.

If the configuration information indicates that there is one SSB candidate position in a time slot and the first set is {4, 8}, the results obtained by performing the modulo operation on 4 and the half of the indexes of all SSB candidate positions in the SSB candidate position set equal to each other. For example, if the second SSB candidate position where the SSB is received in the first period is the SSB candidate position 0, the signal detection positions in the second period are the SSB candidate position 0, the SSB candidate position 8, and the SSB candidate position 16. If the second SSB candidate position where the SSB is received in the first period is the SSB candidate position 2, the signal detection positions in the second period are the SSB candidate position 2, the SSB candidate position 10, and the SSB candidate position 18. If the second SSB candidate position where the SSB is received in the first period is the SSB candidate position 4, the signal detection positions in the second period are the SSB candidate position 4 and the SSB candidate position 12. If the first SSB candidate position where the SSB is received in the first period is the SSB candidate position 6, the signal detection positions in the second period are the SSB candidate position 6 and the SSB candidate position 14, and so on. At each signal detection position, the terminal performs the detection once. When the configuration information indicates that there is an SSB candidate position in a time slot and the indication information is the first indication information, the terminal only needs to perform the detection for 2 or 3 times within the next period.

If the configuration information indicates that there is one SSB candidate position in a time slot and the second set is {1, 2, 4}, all the SSB candidate positions in the second period are determined as the signal detection positions.

Compared with performing the detection at all the SSB candidate positions (i.e., it needs to perform the detection for 10 times at the 10 SSB candidate positions) in the related art, the above two situations can significantly reduce the number of times of detecting a signal by the terminal.

In step 607c, the terminal sequentially detects the target signal at the signal detection positions.

In step 608c, if the terminal detects an SSB at any SSB candidate position, the PDCCH associated with the RMSI is determined based on the SSB candidate positions where the SSB is detected in the second period.

In step 609c, the RMSI is obtained based on the PDCCH.

Implementation processes of the steps 607c to 609c can refer to the foregoing steps 607b to 609b, and detailed descriptions are omitted here.

In embodiments of the disclosure, by carrying, in the SSB, the configuration information used to indicate that there is one SSB candidate position in one time slot or the configuration information used to indicate that there are two SSB candidate positions in one time slot, after the terminal receives the SSB and achieves the synchronization with the access network device based on the received SSB, the distribution of the SSB candidate positions is determined based on the configuration information. That is, after determining the signal detection positions, the SSB can be received by detecting the SSB only at the corresponding signal detection positions within the subsequent periods. Compared with detecting the signal based on a distribution having more SSB candidate positions from the two distributions of the SSB candidate positions in each period, the number of detection of the terminal can be effectively reduced.

In embodiments of the disclosure, by carrying the indication information in the SSB, the terminal can know the value of the QCL parameter adopted by the access network device. Based on the indication information and the SSB candidate position where the SSB is received for the first time by the terminal, the terminal can determine the signal detection positions in the next period, such that the SSB can be detected only at some SSB candidate positions in the next period, thereby reducing the number of times of detecting a signal by the terminal.

By multiplexing the existing bits of the PBCH in the NR technology to carry the indication information, there is no need to increase the load of the PBCH, and it is compatible with the NR technology.

In addition, in embodiments of FIG. 8, the position where the access network device attempts to send the SSB does not change, which reduces changes to the access network device and is easy to implement.

The followings are device embodiments of the disclosure. Details that are not described in the device embodiments can refer to the above method embodiments.

Figure 9:
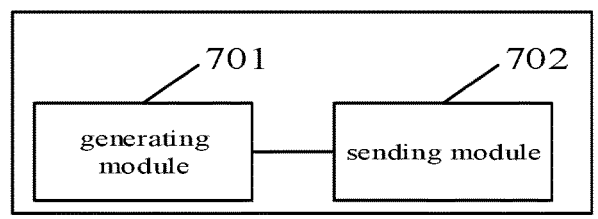
FIG. 9 is a schematic diagram illustrating an apparatus for transmitting information according to an embodiment.

FIG. 9 is a schematic diagram illustrating an apparatus for transmitting information according to an embodiment. The apparatus has the function of realizing the above method example, and the function can be realized by hardware, or by hardware executing corresponding software. As illustrated in FIG. 9, the apparatus includes: a generating module 701 and a sending module 702.

The generating module 701 is configured to generate configuration information. The configuration information is used to indicate that there is a synchronization signal block (SSB) candidate position in a time slot or the configuration information is used to indicate that there are two SSB candidate positions in a time slot. The SSB candidate position is a time domain position where the access network device might send an SSB. The sending module 702 is configured to send the SSB. The physical broadcast channel (PBCH) of the SSB carries the configuration information.

Optionally, the configuration information is represented by a bit of the PBCH that is used to indicate a remaining minimum system information (RMSI) subcarrier spacing (SCS) in a new radio (NR) technology, or the configuration information is represented by a reserved bit in the PBCH.

Optionally, the PBCH of the SSB further carries indication information used to indicate a value of a quasi co-located (QCL) parameter adopted by the access network device.

Optionally, the value of the QCL parameter adopted by the access network device belongs to a first set of selectable values, and the value of the QCL parameter indicated by the indication information belongs to a second set of selectable values. The number of elements in the first set of selectable values is n, where n is greater than or equal to 2, the number of elements in the second set of selectable values is (n−1), and the second set of selectable values is a subset of the first set of selectable values.

Optionally, the first set of selectable values is {1, 2, 4, 8}, and the elements in the second set of selectable values are any three of 1, 2, 4, and 8; or, the first set of selectable values is {2, 4, 8}, and the elements in the second set of selectable values are any two of 2, 4, and 8.

Optionally, the PBCH of the SSB further carries indication information used to indicate whether a value of a quasi co-located (QCL) parameter adopted by the access network device belongs to a first set or a second set, and an intersection set between the first set and the second set is empty.

Optionally, the first set is {8}, and the second set is {1, 2, 4}; or, the first set is {4, 8}, and the second set is {1, 2}.

Optionally, the indication information is represented by a reserved bit in the PBCH.

Figure 10:
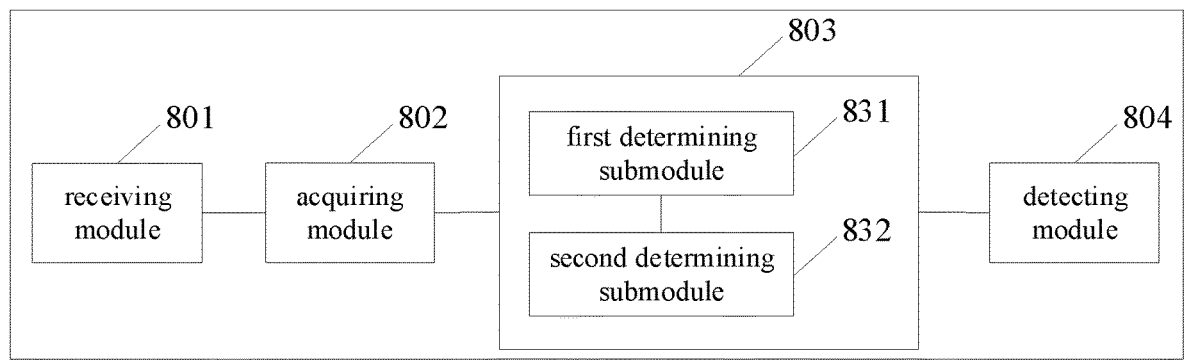
FIG. 10 is a schematic diagram illustrating an apparatus for transmitting information according to an embodiment.

FIG. 10 is a schematic diagram illustrating an apparatus for transmitting information according to an embodiment. The apparatus has the function of realizing the above method example, and the function can be realized by hardware, or by hardware executing corresponding software. As illustrated in FIG. 8, the apparatus for transmitting information includes: a receiving module 801, an acquiring module 802, and a determining module 803.

The receiving module 801 is configured to receive a synchronization signal block (SSB) sent by an access network device. The SSB carries configuration information. The configuration information is used to indicate that there is a SSB candidate position in a time slot or the configuration information is used to indicate that there are two SSB candidate positions in a time slot. The SSB candidate position is a time domain position where the access network device might send the SSB. The acquiring module 802 is configured to acquire the configuration information from a physical broadcast channel (PBCH) of the received SSB. The determining module 803 is configured to determine the SSB candidate position based on the configuration information.

Optionally, the configuration information is represented by a bit of the PBCH in a NR technology, where the bit is used to indicate a RMSI SCS, or the configuration information is represented by a reserved bit in the PBCH.

Optionally, the PBCH of the SSB further carries indication information used to indicate a value of a QCL parameter adopted by the access network device.

Optionally, the value of the QCL parameter adopted by the access network device belongs to a first set of selectable values. The value of the QCL parameter indicated by the indication information belongs to a second set of selectable values. The number of elements in the first set of selectable values is n, where n is greater than or equal to 2. The number of elements in the second set of selectable values is (n−1). The second set of selectable values is a subset of the first set of selectable values.

Optionally, the first set of selectable values is {1, 2, 4, 8}, and the elements in the second set of selectable values are any three of 1, 2, 4, and 8; or, the first set of selectable values is {2, 4, 8}, and the elements in the second set of selectable values are any two of 2, 4, and 8.

Optionally, the PBCH of the SSB further carries indication information used to indicate whether a value of a QCL parameter adopted by the access network device belongs to a first set or a second set, and an intersection set between the first set and the second set is empty.

Optionally, the first set is {8}, and the second set is {1, 2, 4}; or, the first set is {4, 8}, and the second set is {1, 2}.

Optionally, the indication information is represented by a reserved bit in the PBCH.

Optionally, the determining module 803 is configured to determine a signal detection position based on the SSB candidate positions.

The apparatus further includes a detecting module 804, configured to detect the SSB in a second period based on the signal detection position.

Optionally, the determining module 803 is configured to determine each SSB candidate position as a signal detection position; or determine the signal detection position based on the SSB candidate positions, the indication information and a first SSB candidate position, the indication information being used to indicate a value of a QCL parameter adopted by the access network device or the indication information being used to indicate whether the QCL parameter adopted by the access network device belongs to a first set or a second set, the intersection set of the first set and the second set being empty, and the first SSB candidate position being the SSB candidate position where the SSB is received.

Optionally, the determining module 803 includes: a first determining submodule 831 and a second determining submodule 832.

The first determining submodule 831 is configured to determine a SSB candidate position set to which the first SSB candidate position belongs based on the indication information and the SSB candidate positions, each SSB candidate position set includes at least one SSB candidate position, and the at least one SSB candidate position in each SSB candidate position set corresponds to the same beam.

The second determining submodule 832 is configured to determine each SSB candidate position in the SSB candidate position set to which the first SSB candidate position belongs as a signal detection position.

Optionally, in response to the indication information being first indication information and the first set being {8}, a result obtained by performing a modulo operation, with a value of 8, on an index of each SSB candidate position in the SSB candidate position set equals to each other. In response to the indication information being second indication information and the second set being {1, 2, 4}, a result obtained by performing a modulo operation, with a value of 4, on an index of each SSB candidate position in the SSB candidate position set equals to each other. In response to the indication information being first indication information and the first set being {4, 8}, a result obtained by performing a modulo operation, with a value of 4, on an index of each SSB candidate position in the SSB candidate position set equals to each other; In response to the indication information being second indication information and the second set being {1, 2}, a result obtained by performing a modulo operation, with a value of 1, on an index of each SSB candidate position in the SSB candidate position set equals to each other.

Optionally, the determining module 803 is configured to, in response to detecting the SSB at any one SSB candidate position, determine a PDCCH associated with the RMSI based on the SSB candidate position where the SSB is detected. The acquiring module 802 is configured to obtain the RMSI based on the PDCCH.

Figure 11:
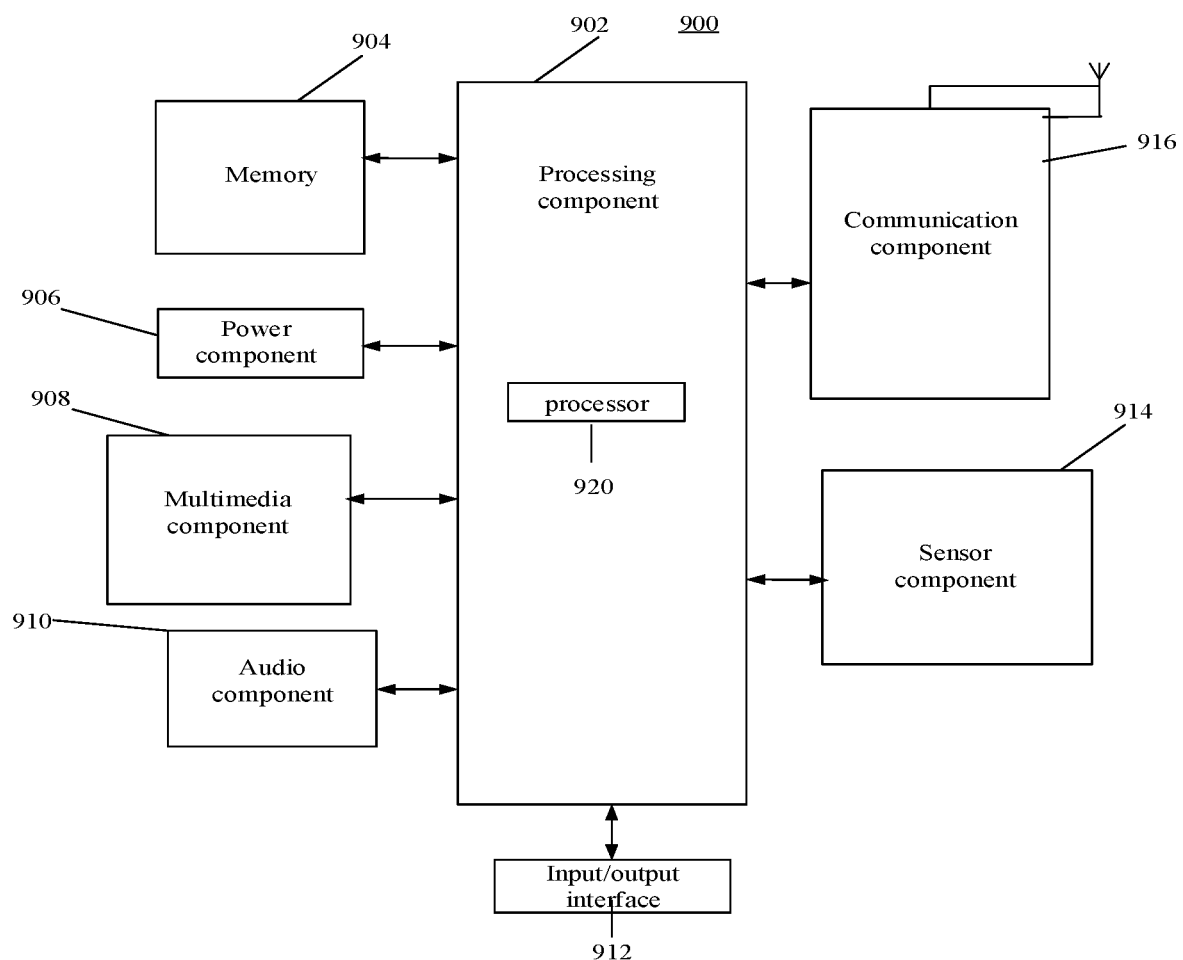
FIG. 11 is a block diagram illustrating an apparatus for transmitting information according to an embodiment.

FIG. 11 is a schematic diagram of an apparatus 900 for transmitting information according to an embodiment, the apparatus 900 may be the above-mentioned terminal. As illustrated in FIG. 11, the apparatus 900 for transmitting information may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 920 to execute instructions to perform all or part of the steps in the above described method. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the apparatus 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The communication component 916 can access a wireless network based on a communication standard, such as WiFi, 2G, 3G, 4G, 5G or a combination thereof. In an embodiment, the communication component 916 receives a broadcast signal or broadcast associated information from an external broadcast management system via a broadcast channel. Optionally, the communication component 916 further includes an NFC module.

In an embodiment, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 904, executable by the processor 920 in the apparatus 900, for performing the above method. For example, the non-transitory computer-readable storage medium may be a ROM, a RAM, a CD-ROM, a magnetic tape, a floppy disc, an optical data storage device, and the like.

Figure 12:
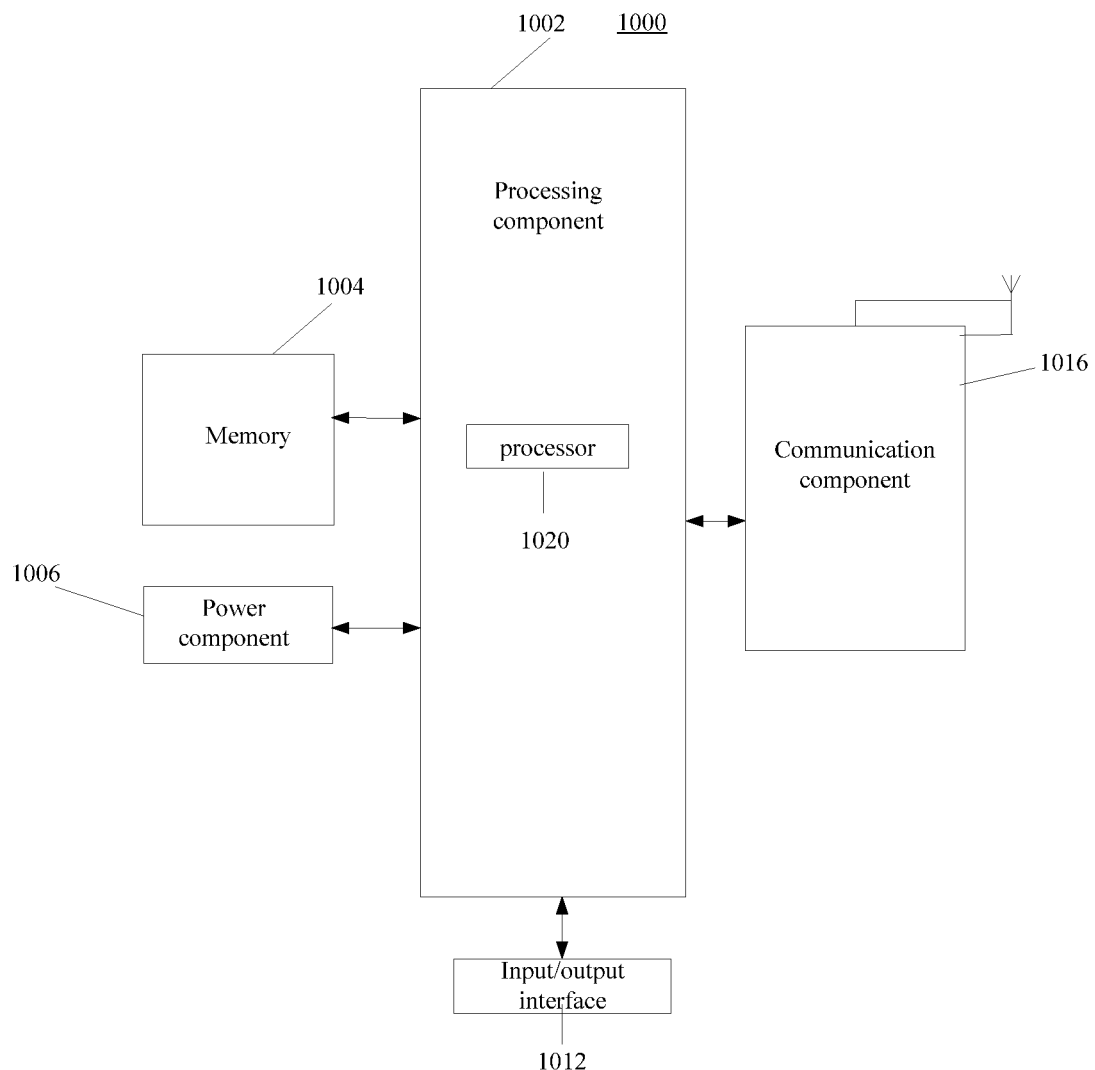
FIG. 12 is a block diagram illustrating an apparatus for transmitting information according to an embodiment.

FIG. 12 is a block diagram of an access network device 1000 according to an embodiment. As illustrated in FIG. 12, the access network device 1000 may include one or more of the following components: a processing component 1002, a memory 1004, a power component 1006, an input/output (I/O) interface 1012, and a communication component 1016.

The processing component 1002 typically controls overall operations of the access network device 1000. The processing component 1002 may include one or more processors 1020 to execute instructions to perform all or part of the steps in the above described method. Moreover, the processing component 1002 may include one or more modules which facilitate the interaction between the processing component 1002 and other components.

The memory 1004 is configured to store various types of data to support the operation of the access network device 1000. Examples of such data include instructions for any applications or methods operated on the access network device 1000. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the access network device 1000. The power component 1006 may include a power management system, one or more power sources, and any other components associated with the generation, management, and distribution of power in the access network device 1000.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The communication component 1016 is configured to facilitate wireless communication between the access network device and other devices. In the embodiments of the disclosure, the communication component 1016 may provide a wireless network based on a communication standard, such as 2G, 3G, 4G, or 5G, or a combination thereof, so as to connect with the terminal device.

In embodiments, the access network device 1000 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, for performing the above described method.

An embodiment of the disclosure also provides a system for transmitting information. The system includes an access network device and a terminal. The terminal is the apparatus for transmitting information according to the embodiment shown in FIG. 11. The access network device is shown in FIG. 12 as the apparatus for transmitting information according to the embodiment.

The technical solution according to the embodiments of the disclosure may include the following beneficial effects.

In embodiments of the disclosure, by carrying, in the SSB, the configuration information used to indicate that there is a synchronization signal block (SSB) candidate position in a time slot or the configuration information used to indicate that there are two SSB candidate positions in a time slot, after the terminal receives the SSB and is synchronized with the access network device based on the received SSB, the distribution of the SSB candidate positions is determined based on the configuration information. That is, the signal detection positions are determined. The SSB can be received by detecting the SSB only at the corresponding signal detection positions in the subsequent periods. Compared with detecting the signal within each period based on one having more SSB candiate positions from two distributions of SSB candidate positions, the number of times of detecting a signal by the terminal can be effectively reduced, and the power consumption of the terminal can be reduced.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting information, comprising:
generating configuration information by an access network device, wherein the configuration information is used to indicate that there is a synchronization signal block (SSB) candidate position in a time slot or the configuration information is used to indicate that there are two SSB candidate positions in a time slot, and the SSB candidate position is a time domain position where the access network device is configured to send an SSB; and
sending the SSB by the access network device, wherein a bit of a physical broadcast channel (PBCH) of the SSB in a new radio (NR) technology used for indicating a remaining minimum system information (RMSI) subcarrier spacing (SCS) carries the configuration information for indicating whether there is one or two SSB candidate positions in the time slot;
wherein the PBCH of the SSB further carries indication information used to indicate whether a value of a quasi co-located (QCL) parameter adopted by the access network device belongs to a first set or a second set, and an intersection set between the first set and the second set is an empty set;
wherein, the first set is {8}, and the second set is {1, 2, 4}; or,
the first set is {4, 8}, and the second set is {1, 2}.

2. The method according to claim 1, wherein the configuration information is represented by a reserved bit in the PBCH.

3. The method according to claim 1, wherein the value of the QCL parameter adopted by the access network device is selected from a first set of selectable values, the value of the QCL parameter indicated by the indication information, to be adopted by the access network device, is selected from a second set of selectable values, a number of elements in the first set of selectable values is n, where n is greater than or equal to 2, a number of elements in the second set of selectable values is (n−1), and the second set of selectable values is a subset of the first set of selectable values.

4. The method according to claim 1, wherein the indication information is represented by a reserved bit in the PBCH.

5. A method for transmitting information, comprising:
receiving, by a terminal, a synchronization signal block (SSB) sent by an access network device, wherein a bit of a physical broadcast channel (PBCH) of the SSB in a new radio (NR) technology used for indicating a remaining minimum system information (RMSI) subcarrier spacing (SCS) carries configuration information for indicating whether there is one or two SSB candidate positions in the time slot, and the SSB candidate position is a time domain position where the access network device is configured to send the SSB;
acquiring the configuration information from a physical broadcast channel (PBCH) of the received SSB; and
determining the SSB candidate position based on the configuration information by the terminal;
wherein the PBCH of the SSB further carries indication information used to indicate whether a value of a quasi co-located (QCL) parameter adopted by the access network device belongs to a first set or a second set, and an intersection set between the first set and the second set is an empty set;
wherein, the first set is {8}, and the second set is {1, 2, 4}; or,
the first set is {4, 8}, and the second set is {1, 2}.

6. The method according to claim 5, wherein the configuration information is represented by a reserved bit in the PBCH.

7. The method according to claim 5, wherein the value of the QCL parameter adopted by the access network device is selected from a first set of selectable values, the value of the QCL parameter indicated by the indication information, to be adopted by the access network device, is selected from a second set of selectable values, a number of elements in the first set of selectable values is n, where n is greater than or equal to 2, a number of elements in the second set of selectable values is (n−1), and the second set of selectable values is a subset of the first set of selectable values.

8. The method according to claim 5, wherein the indication information is represented by a reserved bit in the PBCH.

9. The method according to claim 5, further comprising:
determining, by the terminal, a signal detection position based on the SSB candidate position; and
detecting, by the terminal, the SSB in a second SSB period based on the signal detection position; wherein the second SSB period is after a first SSB period when the SSB sent by the access network device is received;

wherein the signal detection position is each SSB candidate position or each SSB candidate position in an SSB candidate position set from which a first SSB candidate position is selected, the first SSB candidate is the SSB candidate position where the SSB is received.

10. The method according to claim 9, wherein determining, by the terminal, the signal detection position based on the SSB candidate position comprises:

determining, by the terminal, each SSB candidate position as a signal detection position;

or, determining, by the terminal, the signal detection position based on the SSB candidate position, indication information and a first SSB candidate position, wherein the indication information is used to indicate a value of a quasi co-located (QCL) parameter adopted by the access network device or the indication information is used to indicate whether the QCL parameter adopted by the access network device is selected from a first set or a second set, the intersection set of the first set and the second set is an empty set.

11. The method according to claim 10, wherein determining, by the terminal, the signal detection position based on the SSB candidate position, the indication information and the first SSB candidate position, comprises:

determining, by the terminal, a SSB candidate position set from which the first SSB candidate position is selected based on the indication information and the SSB candidate position, each SSB candidate position set comprises at least one SSB candidate position, and the at least one SSB candidate position in each SSB candidate position set corresponds to the same beam; and determining, by the terminal, each SSB candidate position in the SSB candidate position set from which the first SSB candidate position is selected as a signal detection position.

12. The method according to claim 11, wherein, in response to the indication information being first indication information and the first set being {8}, a result obtained by performing a modulo operation, with a value of 8, on an index of each SSB candidate position in the SSB candidate position set equals to each other; or, in response to the indication information being second indication information and the second set being {1, 2, 4}, a result obtained by performing a modulo operation, with a value of 4, on an index of each SSB candidate position in the SSB candidate position set equals to each other; or, in response to the indication information being first indication information and the first set being {4, 8}, a result obtained by performing a modulo operation, with a value of 4, on an index of each SSB candidate position in the SSB candidate position set equals to each other;

or, in response to the indication information being second indication information and the second set being {1, 2}, a result obtained by performing a modulo operation, with a value of 1, on an index of each SSB candidate position in the SSB candidate position set equals to each other.

13. The method according to claim 9, further comprising:

in response to detecting the SSB at any one of the SSB candidate positions, determining a physical downlink control channel (PDCCH) associated with the RMSI based on the SSB candidate position where the SSB is located; and obtaining the RMSI based on the PDCCH.

14. An apparatus for transmitting information, comprising:

a processor;

a memory for storing processor executable instructions;

wherein, the processor is configured to:

generate configuration information, wherein the configuration information is used to indicate that there is a synchronization signal block (SSB) candidate position in a time slot or the configuration information is used to indicate that there are two SSB candidate positions in a time slot, and the SSB candidate position is a time domain position where the apparatus is configured to send an SSB; and send the SSB, wherein a bit of a physical broadcast channel (PBCH) of the SSB in a new radio (NR) technology used for indicating a remaining minimum system information (RMSI) subcarrier spacing (SCS) carries the configuration information for indicating whether there is one or two SSB candidate positions in the time slot;

wherein the PBCH of the SSB further carries indication information used to indicate whether a value of a quasi co-located (QCL) parameter adopted by an access network device belongs to a first set or a second set, and an intersection set between the first set and the second set is an empty set;

wherein, the first set is {8}, and the second set is {1, 2, 4};

or, the first set is {4, 8}, and the second set is {1, 2}.

* * * * *